(12) United States Patent
Chen et al.

(10) Patent No.: US 11,726,616 B2
(45) Date of Patent: Aug. 15, 2023

(54) DISPLAY-AND-TOUCH SYSTEM HAVING INTERFERENCE SENSING CAPACITOR

(71) Applicant: NOVATEK MICROELECTRONICS CORP., Hsinchu (TW)

(72) Inventors: Hung-Kai Chen, Taipei (TW); Feng-Lin Chan, Zhubei (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 17/738,590

(22) Filed: May 6, 2022

(65) Prior Publication Data

US 2022/0357832 A1 Nov. 10, 2022

Related U.S. Application Data

(60) Provisional application No. 63/185,331, filed on May 6, 2021.

(51) Int. Cl.
*G06F 3/041* (2006.01)
(52) U.S. Cl.
CPC .............................. *G06F 3/04184* (2019.05)
(58) Field of Classification Search
CPC ................................................. G06F 3/04184
USPC ........................................................ 345/173
See application file for complete search history.

(56) References Cited

U.S. PATENT DOCUMENTS

| 9,946,404 | B1 * | 4/2018 | Berget | G06F 3/0443 |
| 10,394,386 | B1 * | 8/2019 | Fronczak | G06F 3/0418 |
| 2018/0329573 | A1 * | 11/2018 | Liu | G06F 3/04184 |

FOREIGN PATENT DOCUMENTS

| CN | 101673163 A | 3/2010 |
| CN | 102147678 A | 8/2011 |
| CN | 202394215 U | 8/2012 |
| CN | 103902121 B | 3/2017 |

\* cited by examiner

*Primary Examiner* — Long D Pham
(74) *Attorney, Agent, or Firm* — Marshall, Gerstein & Borun LLP

(57) ABSTRACT

A touch control circuit, display-and-touch system, touch panel and touch sensing method are disclosed. The system includes a display panel, a touch panel having a plurality of touch sensors, a touch control circuit and at least one interference sensing capacitor configured to be insensitive to a touch on the touch panel and interference other than the interference from an interference layer of the display panel, the touch control circuit includes: at least one interference sensing channel configured to receive an interference sensing signal from the at least one interference sensing capacitor; and a plurality of touch sensing channels configured to receive touch sensing signals from at least part of touch sensors of the plurality of touch sensors; wherein a first electrode of each interference sensing capacitor is connected with the interference layer of the display panel, and a second electrode thereof is connected with a corresponding interference sensing channel.

18 Claims, 12 Drawing Sheets

DISPLAY-AND-TOUCH SYSTEM HAVING INTERFERENCE SENSING CAPACITOR

CROSS-REFERENCES TO RELATED APPLICATIONS

The present application claims the benefit of U.S. Provisional Application No. 63/185,331 filed to the U.S. Patent and Trademark Office on May 6, 2021, the entire disclosure of which is incorporated herein by reference.

TECHNICAL FIELD

The present application relates to the field of touch control technology, and more particularly, to a touch control circuit, a display-and-touch system, a touch panel and a touch sensing method.

BACKGROUND

Organic Light-Emitting Diode (OLED) is one type of Light-Emitting Diode (LED), and its emission electroluminescent layer is composed of organic compounds that can emit light due to the received current. OLED is widely used in display panels of electronic devices, such as TV screens, computer monitors, a variety of portable devices such as mobile phones, handheld game consoles and Personal Digital Assistants (PDAs), etc.

To provide various functions to the user, an electronic device may have a function of recognizing a touch event on the display panel and performing input processing based on the recognized touch. For example, a collection of components used to realize the display and touch sensing functions in the electronic device may be referred to as the display-and-touch system. In the display-and-touch system, the touch sensing layer may be arranged on the display panel (on-cell) or embedded into the display panel (in-cell). The touch sensing layer may be driven to detect whether a touch event occurs on the display panel and to detect touch coordinates, etc.

Since the display panel has display electrodes or signal lines that are arranged thereon, so that various voltage signals are applied to the display panel for, for example, display driving operation or display operation, parasitic capacitors formed between the display electrodes and the touch electrodes of the touch sensing layer may degrade the touch sensing performance. Moreover, as the panels become thinner, the parasitic capacitors with a larger capacitance exist between the touch electrodes of the touch sensing layer and the display electrodes of the display panel.

Each parasitic capacitor may act as a path along which noise can be transmitted to the touch sensing layer. For example, noise (also referred to as coupling noise, interference, or noise interference herein) from the display panel can be transmitted to the touch electrodes of the touch sensing layer via paths formed by the parasitic capacitors between the display electrodes of the display panel and the touch electrodes of the touch sensing layer, thereby affecting touch sensing signals received from the touch electrodes.

Therefore, there is a need for a scheme that can eliminate or reduce the interference caused by the noise from the display panel on the touch sensing result of the touch sensing layer.

SUMMARY

According to a first aspect of the present application, there is provided a touch control circuit for a display-and-touch system, wherein the display-and-touch system comprises a display panel, a touch panel and the touch control circuit, the touch panel has a plurality of touch sensors arranged in an array, and the touch control circuit comprises: at least one interference sensing capacitor configured to be insensitive to a touch on the touch panel and interference other than interference from an interference layer of the display panel; at least one interference sensing channel configured to receive an interference sensing signal from the at least one interference sensing capacitor; and a plurality of touch sensing channels configured to receive touch sensing signals from at least part of touch sensors of the plurality of touch sensors; wherein a first electrode of each interference sensing capacitor is connected with the interference layer of the display panel, and a second electrode of the interference sensing capacitor is connected with a corresponding interference sensing channel.

According to a second aspect of the present application, there is provided a display-and-touch system, wherein the display-and-touch system comprises a display panel, a touch panel, a touch control circuit and at least one interference sensing capacitor, wherein the at least one interference sensing capacitor is configured to be insensitive to a touch on the touch panel and interference other than interference from an interference layer of the display panel, the touch panel has a plurality of touch sensors, and the touch control circuit comprises: at least one interference sensing channel configured to receive an interference sensing signal from the at least one interference sensing capacitor; and a plurality of touch sensing channels configured to receive touch sensing signals from at least part of touch sensors of the plurality of touch sensors; wherein a first electrode of each interference sensing capacitor is connected with the interference layer of the display panel, and a second electrode thereof is connected with a corresponding interference sensing channel.

According to a third aspect of the present application, there is provided a touch panel for a display-and-touch system, wherein the display-and-touch system comprises a display panel, a touch panel and a touch control circuit, the touch panel comprises: a plurality of touch sensors and at least one interference sensor, wherein each touch sensor is used to provide a touch sensing signal to the touch control circuit, and there is a parasitic capacitor between each touch sensor and an interference layer of the display panel, and each touch sensor is connected with a corresponding touch sensing channel in the touch control circuit; each interference sensor is used to provide an interference sensing signal to the touch control circuit, and there is a parasitic capacitor between each interference sensor and the interference layer of the display panel to serve as an interference sensing capacitor, each interference sensor is connected with a corresponding interference sensing channel in the touch control circuit, and each interference sensing capacitor is insensitive to a touch on the touch panel and interference other than interference from the interference layer.

According to a fourth aspect of the present application, there is provided a touch sensing method used in a display-and-touch system, wherein the display-and-touch system comprises a display panel, a touch panel having a plurality of touch sensors, a touch control circuit including a plurality of touch sensing channels and at least one interference sensing channel, and at least one interference sensing capacitor, and the method comprises: receiving an interference sensing signal from the at least one interference sensing capacitor through the at least one interference sensing channel; receiving touch sensing signals from the plurality of touch sensors through the plurality of touch sensing channels; determining a touch position in the display-and-touch system based on the touch sensing signal received from the plurality of touch sensors and the interference sensing signal received from the at least one interference sensing capacitor, wherein the at least one interference sensing capacitor is insensitive to a touch on the touch panel and interference other than interference from an interference layer of the display panel, and a first electrode of each interference sensing capacitor is connected with the interference layer of the display panel, and a second electrode thereof is connected with a corresponding interference sensing channel.

In the embodiments of the present application, the interference sensing capacitor used for noise interference sensing is arranged outside the touch area of the touch panel or at a position which is not easily affected by interference sources such as a touch by other objects, water, chargers, or high-power devices, so that the touch control circuit can obtain more accurate noise from the interference layer of the display panel, and thus the noise from the interference layer of the display panel can be more accurately eliminated with regard to the touch sensing signals received from the touch sensors, so as to improve accuracy of the touch sensing result.

DETAILED DESCRIPTION OF THE EMBODIMENTS

Figure 1:
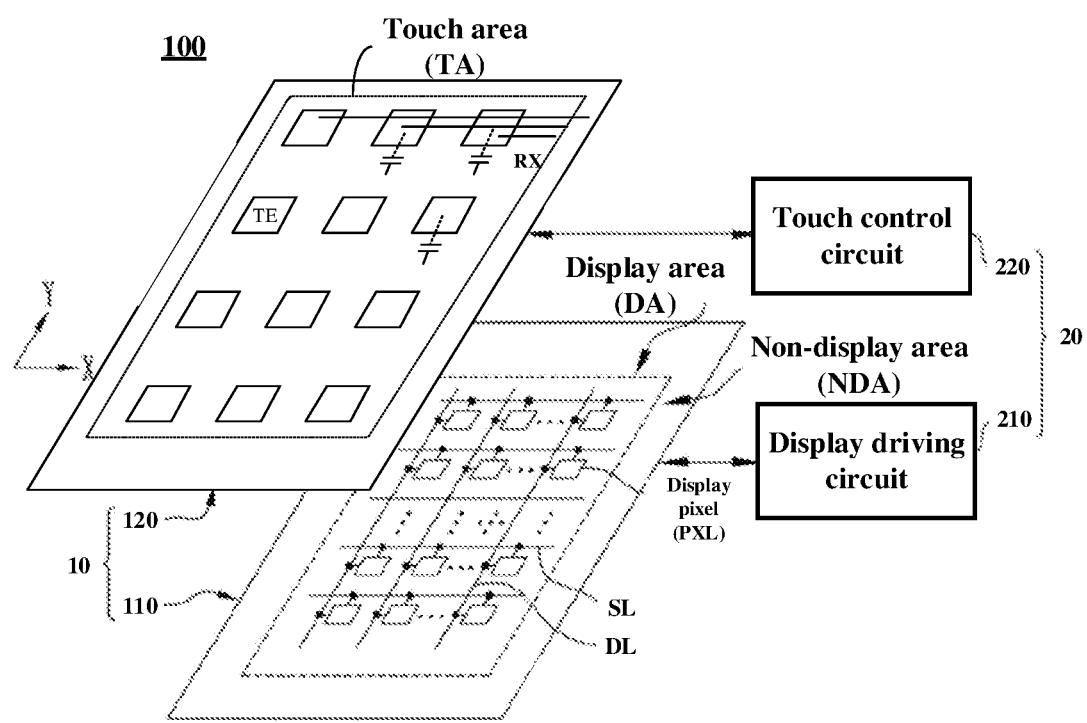
FIG. 1 shows a schematic structural diagram of a display-and-touch system.

The term "coupling (or connecting)" is widely used throughout the specification (including the claims) of the present application, and covers both direct and indirect connecting or coupling members. For example, if the present disclosure describes that the first device is coupled (or connected) to the second device, it should be interpreted that the first device may be directly connected to the second device, or the first device may be indirectly connected to the second device via other devices or a certain coupling member. Terms such as "first" and "second" mentioned throughout the specification (including the claims) of the present application are only used to name elements/components or to distinguish different embodiments or ranges, not intended to limit the upper or lower limit of the number of elements/components or the order of elements/components. In addition, elements/components/steps with the same reference signs represent the same or similar parts in the drawings and the embodiments. As for elements/components/steps with the same reference signs in different embodiments, relevant descriptions can be referenced. The singular expression may include the plural expression, and the plural expression may also include the singular expression, unless the context clearly defines otherwise.

FIG. 1 shows a schematic diagram of a display-and-touch system according to an embodiment of the present application. In some embodiments, as shown in FIG. 1, the touch sensing layer included in the display-and-touch system 100 includes a plurality of touch sensors that use a self-capacitance scheme, but the type of the touch sensors that can be used in the display-and-touch system 100 is not limited to the specific type as shown.

Referring to FIG. 1, the display-and-touch system 100 according to an embodiment of the present disclosure includes a panel unit 10 and a driving circuit 20 for driving the panel unit 10. In some embodiments, the panel unit 10 includes a display 110 (e.g., a display panel) for displaying an image and a touch sensing layer 120 (e.g., a touch screen or a touch panel) for sensing a touch input. On the other hand, the driving circuit 20 includes a display driving circuit 210 for driving the display panel 110 and a touch control circuit 220 for driving the touch sensors of the touch sensing layer 120. In some embodiments, the display driving circuit 210 and the touch control circuit 220 may be configured independently of each other. In other embodiments, at least part of the display driver circuit 210 and the touch control circuit 220 may be integrated into one driver IC chip (e.g., integrated into one TDDI (Touch and Display Driver Integrated) chip).

In some embodiments, after the display panel 110 and the touch sensing layer 120 are manufactured independently of each other, the display panel 110 and the touch sensing layer 120 may be disposed and/or coupled such that the display area (DA) of the display panel 110 at least partially overlaps with the touch area (TA) of the touch sensing layer 120. In another embodiment, the display panel 110 and the touch sensing layer 120 may be integrally manufactured, and the display area (DA) of the display panel 110 at least partially overlaps with the touch area (TA) of the touch sensing layer 120.

The type of the display panel 110 is not particularly limited. For example, the display panel 110 may be realized by using a self-luminous display panel such as an organic light-emitting display panel (OLED display panel) or a Micro LED. Optionally, the display panel 110 may be realized by a non-luminous display panel such as a liquid crystal display panel (LCD panel) or a mini LED. When the display panel 110 is realized using a non-luminous display panel, the display-and-touch system 100 may additionally include a light source, such as a backlight unit (BLU).

The touch sensing layer 120 may include a sensor substrate and a plurality of sensor electrodes TE (also referred to as touch sensors, touch electrodes, etc.) formed on the sensor substrate. The sensors may be disposed in the touch area on the sensor substrate. The sensor substrate may be a rigid substrate or a flexible substrate. For example, the sensor substrate may be a rigid substrate configured with glass or tempered glass, or a flexible substrate configured with a thin film made of plastic or metal. In some embodiments, one of the substrates constituting the display panel 110 (e.g., the thin film encapsulation layer of the display panel) may be used as the sensor substrate of the touch sensing layer.

In the embodiment shown in FIG. 1, each sensor electrode of the touch sensing layer corresponds to one self-capacitor, for example, relative to the common electrode layer of the display panel or other reference terminals. Each sensor electrode is connected to the touch control circuit 220 through a sensing line (RX). Optionally, the touch control circuit is used to apply a touch excitation signal (e.g., a sine wave signal, a square wave signal, a triangular wave signal, or other signals with a variable amplitude or frequency) to each sensor electrode, and to receive a touch sensing signal from each sensor electrode. The touch sensing signal may be used to determine an occurrence of a touch event and/or a touch position.

Figure 2:
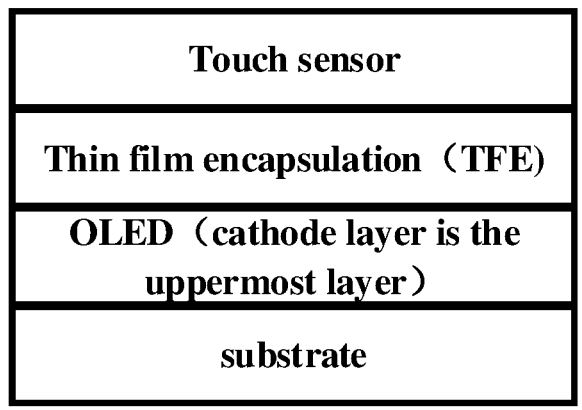
FIG. 2 shows a schematic structural diagram of the display-and-touch system shown in FIG. 1 when the panel unit 10 in the display-and-touch system includes an OLED display-and-touch panel.

As an example, FIG. 2 shows a schematic structural diagram of the display-and-touch system shown in FIG. 1 when the panel unit 10 in the display-and-touch system includes an organic light emitting diode (OLED) display panel and a touch panel (collectively referred to as an OLED display-and-touch panel).

In the example of FIG. 2, an example structure of the panel unit 10 (also referred to as the display-and-touch panel) is simply shown by taking a touch sensing layer 120 being arranged on an OLED display panel 110 in an on-cell manner as an example.

The light-emitting layer of the OLED display panel is formed on the substrate and may include a plurality of layers (e.g., an anode layer and a cathode layer). A thin film encapsulation (TFE) layer is arranged on the upper surface of the light-emitting layer of the OLED display panel, and the touch sensing layer is arranged on the upper surface of the thin film encapsulation layer.

Figure 3:
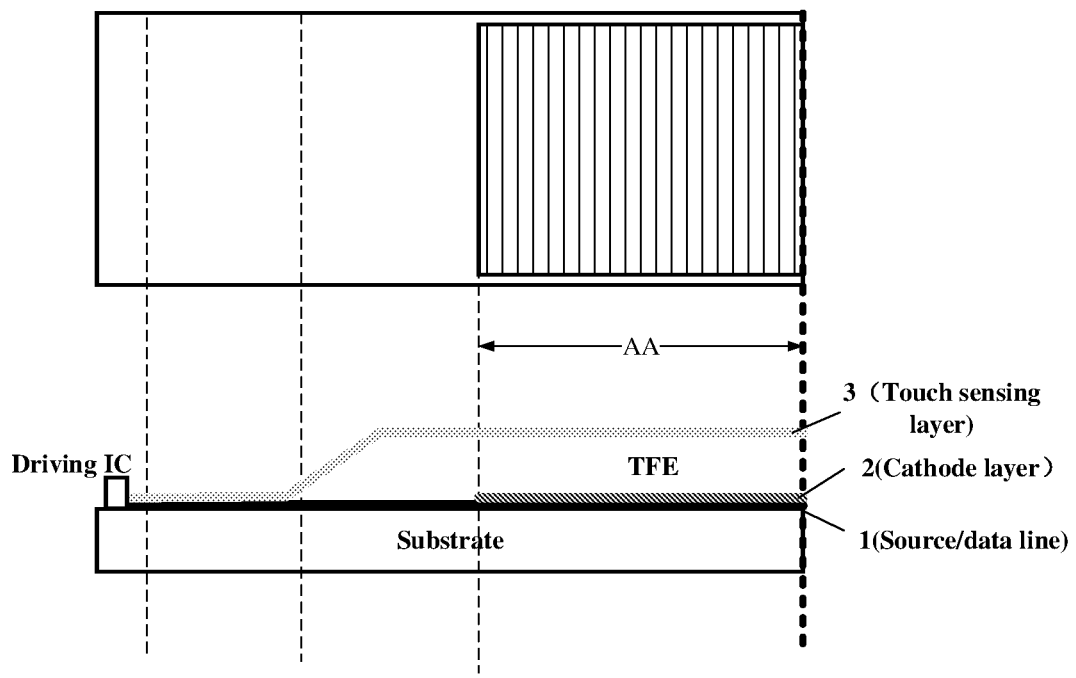
FIG. 3 shows a schematic planar view and a cross-sectional view of the OLED display-and-touch panel of FIG. 2.

FIG. 3 shows a schematic planar view and a cross-sectional view of the OLED display-and-touch panel of FIG. 2.

In FIG. 3, the complete structure of the light-emitting layer of the OLED display panel of the OLED display-and-touch panel is omitted and not shown in the schematic cross-sectional view, only the cathode layer of the OLED display panel is shown as the uppermost layer of the light-emitting layer of the OLED display panel by way of example. Of course, the anode layer of the OLED display panel may also be the uppermost layer of the OLED light-emitting layer according to different arrangements.

It can be seen from the schematic cross-sectional view that, in the AA area, from bottom to top, there are the substrate, the OLED light-emitting layer (the cathode layer is the uppermost layer), the thin film encapsulation (TFE) layer and the touch sensing layer (also referred to as the touch panel). The area on the OLED display-and-touch panel corresponding to the AA area is an area with both the touch sensing function and the display function. In the structure of the light-emitting layer of the OLED display panel shown in FIG. 2, the layer closest to the touch sensing layer is the OLED cathode layer.

The display driving circuit and the touch control circuit of the OLED display-and-touch panel (e.g., integrated into one driving IC) are connected with the display panel and the touch sensing layer through wirings. For example, the source data lines to provide display data to the OLED light-emitting layer of the display panel extend from the outputs of the driving circuit to the OLED light-emitting layer, as shown by the reference number 1 in FIG. 3; the OLED light-emitting layer may be provided on the substrate, wherein the cathode layer is the uppermost layer, as shown by the reference number 2 in FIG. 3, and the cathode layer may be supplied with a voltage of, for example, 0V; and the sensing lines between the touch sensing layer and the touch control circuit extend from the outputs of the driving circuit to the touch sensing layer, as shown by the reference number 3 in FIG. 3. Optionally, the source data lines are insulated by the thin film encapsulation (TFE) layer from the sensing lines and the touch sensing layer.

Optionally, the touch control circuit and the display driving circuit for driving the OLED display-and-touch panel may be two separate chips or integrated into one chip. The integrated chip is referred to as the Touch and Display Driver Integrated (TDDI) chip.

As mentioned above, there may be parasitic capacitors between display electrodes of the display panel (e.g., the closer one of the cathode layer and the anode layer of OLED display panel with respect to the touch sensing layer) and the sensor electrodes in the touch sensing layer, so the noise from the display panel can be transmitted to the touch sensing layer through the parasitic capacitors, thereby interfering with the touch sensing result. Alternatively, even for the display-and-touch panel arranged in an in-cell manner, there are parasitic capacitors between the display electrodes and the sensor electrodes, so the noise from the display panel will affect the touch sensing result via these parasitic capacitors. The display electrodes may also be data lines, gate lines, etc., but in view of that the parasitic capacitors between the data lines or the gate lines and the sensor electrode are very small compared with the parasitic capacitors between for example the cathode layer or the anode layer of the OLED display panel (the closer one with respect to the touch sensing layer) and the sensor electrodes, they can be ignored in order not to obscure the invention purpose of the present application.

In addition, for other types of display panels, such as Micro LED or mini LED etc., at least one layer in their respective internal structure may also form parasitic capacitors with the sensor electrodes in the touch sensing layer, thus serving as an interference layer that may interfere with the touch sensing result. Therefore, the method of eliminating or reducing the interference caused by the coupling noise from the display panel according to the embodiment of the present disclosure as to be described later may also be adopted for other types of display panels.

In the context of the present application, description is made mainly with respect to the OLED display-and-touch panel arranged in an on-cell manner. However, it should be understood that various embodiments of the present application may also be applied to display-and-touch panels including other types of display panels and arranged in an in-cell manner based on logical reasoning.

Figure 4:
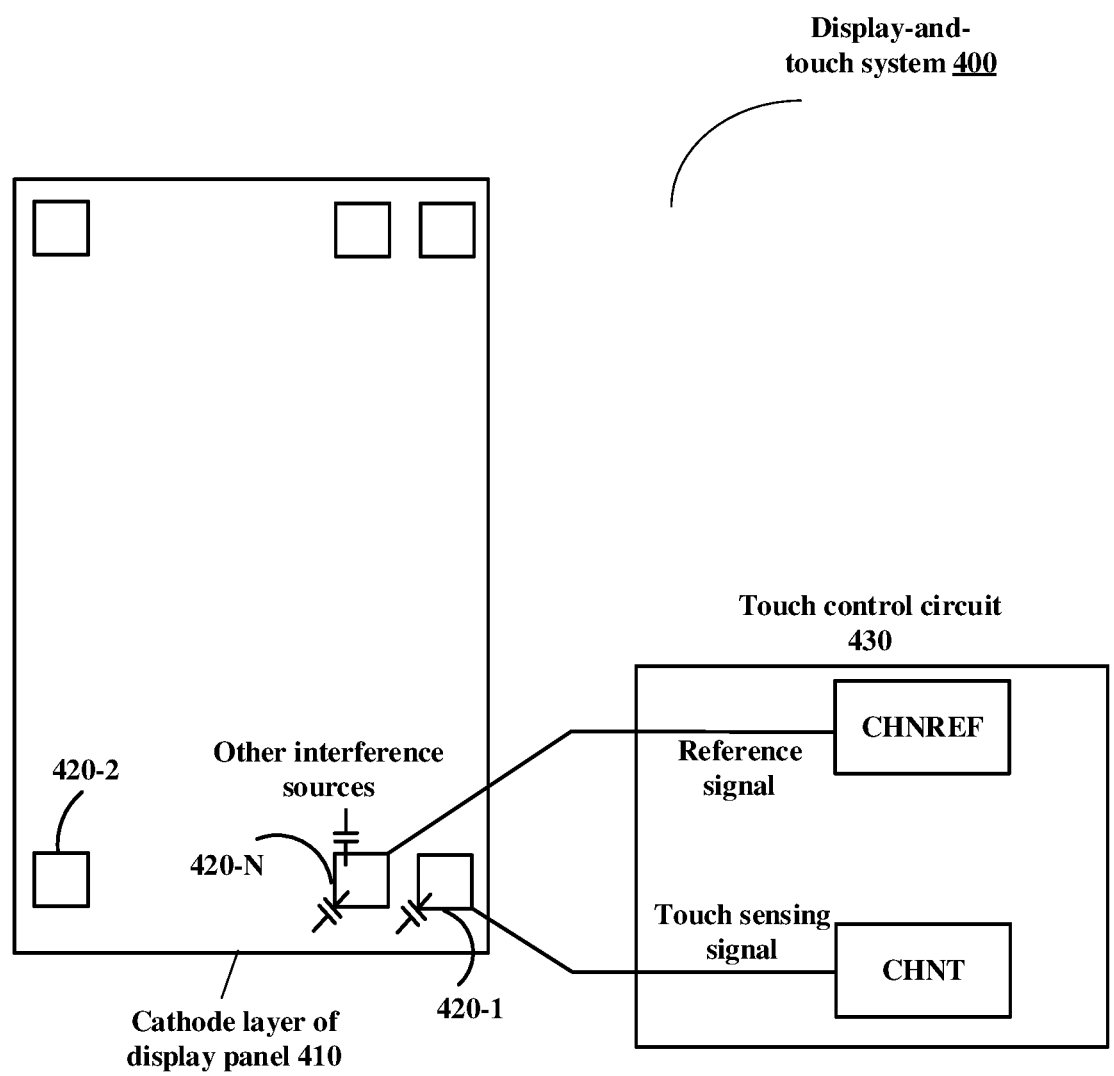
FIG. 4 shows a schematic structural diagram of a display-and-touch system capable of eliminating noise from a display panel.

FIG. 4 shows a schematic diagram of a display-and-touch system capable of eliminating noise from a display panel. The display-and-touch system 400 of FIG. 4 is similar in structure to the display-and-touch system 100 described with reference to FIG. 1.

In FIG. 4, as an example, for the sensor electrodes (also referred to as the touch sensors) of the touch sensing layer or the touch panel, the primary noise source from the OLED display panel is one of the cathode layer and the anode layer in the light-emitting layer structure which is closer to the touch panel, and there are parasitic capacitors between the closer one layer and the touch electrodes.

The display-and-touch system 400 includes a display panel 410 (the cathode layer of which is shown in FIG. 4), a touch panel 420 (e.g., the touch panel includes a plurality of touch sensors or touch electrodes 420-1, 420-2, ... 420-N arranged in an array) and a touch control circuit 430, and each touch sensor corresponds to one touch sensing channel in the touch control circuit 330.

As shown in FIG. 4, the touch control circuit 430 includes a plurality of touch sensing channels, which can receive touch sensing signals from the plurality of touch sensors corresponding thereto. For example, each touch sensing channel includes an Analog Front End (AFE) circuit for processing the signal from a touch sensor corresponding to the touch sensing channel. As shown in FIG. 4, the touch sensor 420-1 can perform touch sensing, and because of existence of the parasitic capacitor, the noise from the cathode layer of the OLED display panel is coupled to the touch sensor 420-1 through the parasitic capacitor between the touch sensor 420-1 and the cathode layer of the OLED display panel. Thus, the touch sensing signal received by the corresponding touch sensing channel (including the analog front-end circuit) of the touch sensor 420-1 from the touch sensor 420-1 is interfered by the coupling noise from the cathode layer of the OLED display panel. Another touch sensor 420-N may be used for noise sensing (e.g., no touch excitation signal is applied to the touch sensor or a touch excitation signal with a DC voltage is applied to the touch sensor), the noise from the cathode layer of the OLED display panel is also coupled to the touch sensor 420-N through the parasitic capacitor between the touch sensor 420-N and the cathode layer of the OLED display panel, and the touch sensing signal received by the interference sensing channel CHNREF corresponding to the touch sensor 420-N from the touch sensor 420-N also includes the coupling noise from the cathode layer of the OLED display panel. Other touch sensing channels of the touch control circuit 330 can remove or reduce the coupling noise from the cathode layer of the OLED display panel from the signals generated by these touch sensing channels according to the signal generated by the interference sensing channel CHNREF. In addition, when detecting whether a touch event occurs at the touch sensor 420-N, another touch sensor (e.g., an adjacent touch sensor) may be used for noise sensing at another time, and the signal received from the other touch sensor may be used to remove or reduce the above-mentioned coupling noise in the signal received from the touch sensor 420-N.

In the context of the present application, the parasitic capacitor between the touch sensor (e.g., 420-N) used for noise sensing and the cathode layer of the OLED display panel is referred to as the reference capacitor or the interference sensing capacitor. Since one terminal of the interference sensing capacitor is coupled to the noise source (i.e., the cathode layer of the OLED display panel), theoretically, the signal received from the touch sensor 420-N (i.e., the other terminal of the reference capacitor) is suitable to serve as the reference signal for noise elimination.

However, the touch sensors included in the touch sensing layer will be affected by the touch on the touch panel and other interference sources other than the interference layer (e.g., one of the cathode layer and the anode layer of the OLED display panel which is closer to the touch panel) of the display panel, wherein the other interference sources may include, for example, a touch by other objects, water, noise of a charger for a device including the display-and-touch system (e.g., when a mobile phone is charged by using the charger, the noise of the charger will also affect touch sensing performance), high-power signal interference (e.g., interference from a lighting device such as a fluorescent lamp, because the touch sensing performance will also be affected when the lighting device illuminates a device including the display-and-touch system), and so on. Thus, in fact, the signal received from each touch sensor may include not only the noise from the cathode layer of the OLED display panel, but also the noise from other interference sources mentioned above.

For example, as shown in FIG. 4, when a touch event occurs at the touch sensor 420-1 for touch sensing and there are no other interference sources except for the cathode layer of the OLED display panel, but the touch sensor 420-N for noise sensing is interfered by other interference sources, the noise from the cathode layer of the OLED display panel and the noise from the other interference sources are coupled to the touch sensor 420-N, for example, via capacitors, that is, the touch sensors 420-1 and 420-N are not subjected to the same noise. Thus, if the touch control circuit 430 still make reference to the touch sensing signal received by the interference sensing channel CHNREF from the touch sensor 420-N and uses it as the reference signal for noise elimination, it may not be able to accurately distinguish effective touch information from the noise in the touch sensing signal. For example, the touch event that occurs at the touch sensor 420-1 causes the value of the corresponding touch sensing signal to increase, however, since the noise from other interference sources at the touch sensor 420-N will also make the value of the reference signal greater than the value of the reference signal when there are no other interference sources, the touch control circuit may determine that no touch event occurs based on the two signals. In other words, noise (interference) from other interference sources other than the interference layer of the display panel will reduce accuracy of the touch sensing result.

It should be noted that the above-mentioned problem that the touch sensor used for noise sensing is affected by other interference sources other than the interference layer of the display panel is not limited to the display-and-touch system including the OLED display-and-touch panel arranged in an on-cell manner. For example, the similar interference or noise elimination method as described in FIG. 4 may also be adopted in the display-and-touch system including a Mini LED/Micro LED display panel and/or an OLED display-and-touch panel arranged in an in-cell manner, so the above-mentioned problems caused by the touch on the touch panel and/or other interference sources will also exist.

To this end, the embodiment of the present application provides a method for avoiding the interference on the touch sensing signals due to the touch on the touch panel and the coupling noise from other interference sources (such as the touch by other objects, water, the noise of chargers or high-power devices), which can make the touch control circuit avoid the interference of the touch and the noise from these other interference sources on the reference signal used for noise elimination, so as to more accurately determine whether a touch event occurs when processing the touch sensing signals.

Figure 5:
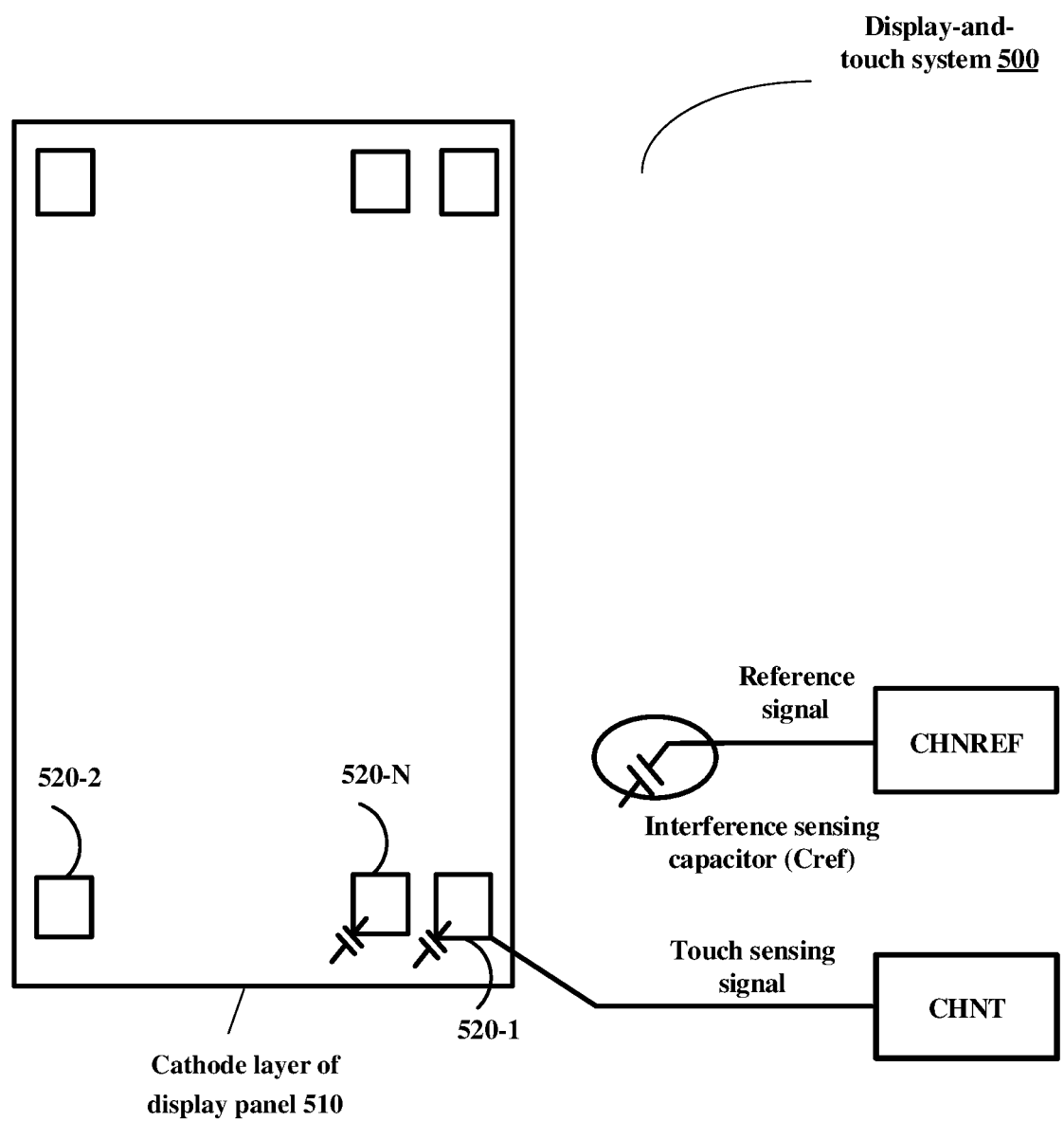
FIG. 5 is a schematic structural diagram of a display-and-touch system capable of eliminating noise from a display panel according to an embodiment of the present application.

FIG. 5 shows a schematic diagram of a display-and-touch system according to an embodiment of the present application, wherein an interference sensing capacitor for noise sensing is arranged outside the touch area of the touch panel or at a position that is not easily affected by interference sources such as the touch by other objects, water, chargers, or high-power devices. In this way, the touch control circuit can obtain more accurate noise from the interference layer of the display panel, so that the noise from the interference layer of the display panel can be more accurately eliminated with regard to the touch sensing signals received from the touch sensors.

As shown in FIG. 5, the display-and-touch system 500 includes a display panel 510, a touch panel 520, a touch control circuit 530 and at least one interference sensing capacitor Cref, and the touch panel 520 has a plurality of touch sensors 520-1 to 520-N.

Optionally, the plurality of touch sensors may be arranged in an array.

The touch control circuit 530 of the display-and-touch system 500 may include at least one interference sensing channel CHNREF and a plurality of touch sensing channels CHNT.

In FIG. 5, for convenience of description, only one interference sensing capacitor, one interference sensing channel and one touch sensing channel are shown, but it should be understood that there may be a larger number of interference sensing capacitors, interference sensing channels and touch sensing channels arranged similarly, and the number of touch sensing channels is generally multiple in consideration of the practical application and arrangement of the touch sensing layer.

At least one interference sensing capacitor Cref may be arranged at a position insensitive to interference caused by touch on the touch panel and interference other than the interference from the interference layer of the display panel, so as to be insensitive to these interferences, wherein the first electrode of each interference sensing capacitor is connected with the interference layer of the display panel, e.g., directly or indirectly, and the second electrode thereof is used to output the interference sensing signal (i.e., the reference signal). For example, since the first electrode of each interference sensing capacitor Cref is connected to the interference layer of the display panel, noise from the interference layer of the display panel can be transmitted. However, as for interferences caused by the touch on the touch panel and other interference sources such as the touch by other objects, water, chargers or high-power devices, the interference sensing capacitor Cref will not be sensitive to these interferences, that is, these interferences will not affect the capacitance of the interference sensing capacitor Cref, so the interference sensing signal received by the touch control circuit 530 from the interference sensing capacitor Cref will almost only change according to the interference (coupling noise) from the interference layer of the display panel.

At least one interference sensing channel CHNREF may be configured to receive an interference sensing signal from the at least one interference sensing capacitor. For example, the second electrode of each interference sensing capacitor is connected to a corresponding one interference sensing channel CHNREF. For example, each interference sensing channel CHNREF may include an analog front-end circuit.

It should be understood that the interference sensing capacitors and the interference sensing channels may not be in one-to-one correspondence, instead multiple interference sensing capacitors may be connected to a same one interference sensing channel in a time-division manner by, for example, a switching module (e.g., a multiplexer MUX), so that the same one interference sensing channel receives interference sensing signals from each of the multiple interference sensing capacitors in a time-division manner.

In addition, the plurality of touch sensing channels CHNT may be configured to receive touch sensing signals from at least part of the plurality of touch sensors included in the touch sensing layer.

For convenience of description, the first electrode of the parasitic capacitor corresponding to each touch sensor (e.g., formed between the interference layer of the display panel 510 and the touch sensor) may be regarded as being connected to the interference layer of the display panel 510, and the second electrode of the parasitic capacitor corresponding to each touch sensor may be regarded as being connected to the touch sensor and used as an output terminal for a touch sensing signal, for providing the touch sensing signal to the touch control circuit 530.

Similarly, the touch sensors and the touch sensing channels may not be in one-to-one correspondence, instead multiple touch sensors may be connected to a same one touch sensing channel in a time-division manner by, for example, a switching module (e.g., a multiplexer), so that the same one touch sensing channel receives touch sensing signals from each of the multiple touch sensors in a time-division manner. Therefore, the plurality of touch sensing channels CHNT may only receive touch sensing signals from at least part of the plurality of touch sensors included in the touch sensing layer at each sensing time.

Optionally, the capacitance value of the interference sensing capacitor Cref may be the same as or different from the capacitance value of the parasitic capacitor between each touch sensor and the interference layer of the display panel.

Optionally, the touch control circuit 530 may include the at least one interference sensing capacitor Cref and may be integrated in one chip. The at least one interference sensing capacitor Cref each may be an independent capacitor or an existing capacitor in the at least one interference sensing channel CHNREF, the present disclosure makes no limitation thereto.

With the display-and-touch system described with reference to FIG. 5, the interference sensing capacitor used for noise interference sensing is arranged outside the touch area of the touch panel or at a position that is not easily affected by interference sources such as touch by other objects, water, chargers, or high-power devices, so that the touch control circuit can obtain more accurate noise from the interference layer of the display panel, and thus the noise from the interference layer of the display panel can be more accurately eliminated with regard to the touch sensing signals received from the touch sensors.

It should be noted that in the context of the present application, although it is described by taking the first electrode of an interference sensing capacitor coupled to the cathode layer of the OLED display panel as an example, this is not a limitation. If based on other architectures of the OLED display panel, such as the anode layer of the OLED display panel is located at the uppermost layer in the light-emitting layer of OLED display panel, the anode layer of the OLED display panel is the main interference source for the touch sensors arranged thereon in an on-cell manner, that is, serving as the interference layer, in this case, the first electrode of the interference sensing capacitor may be coupled to the anode layer of the OLED display panel. In addition, as for the structure of the OLED display-and-touch panel arranged in the in-cell manner, if the cathode layer or the anode layer of the OLED display-and-touch panel is the main interference source for touch sensing, the interference sensing capacitor may be similarly set, so as to eliminate the noise from the interference layer of the display panel.

The display-and-touch system of the embodiment of the present application will be described in more detail below with reference to FIGS. 6 to 12.

Figure 6:
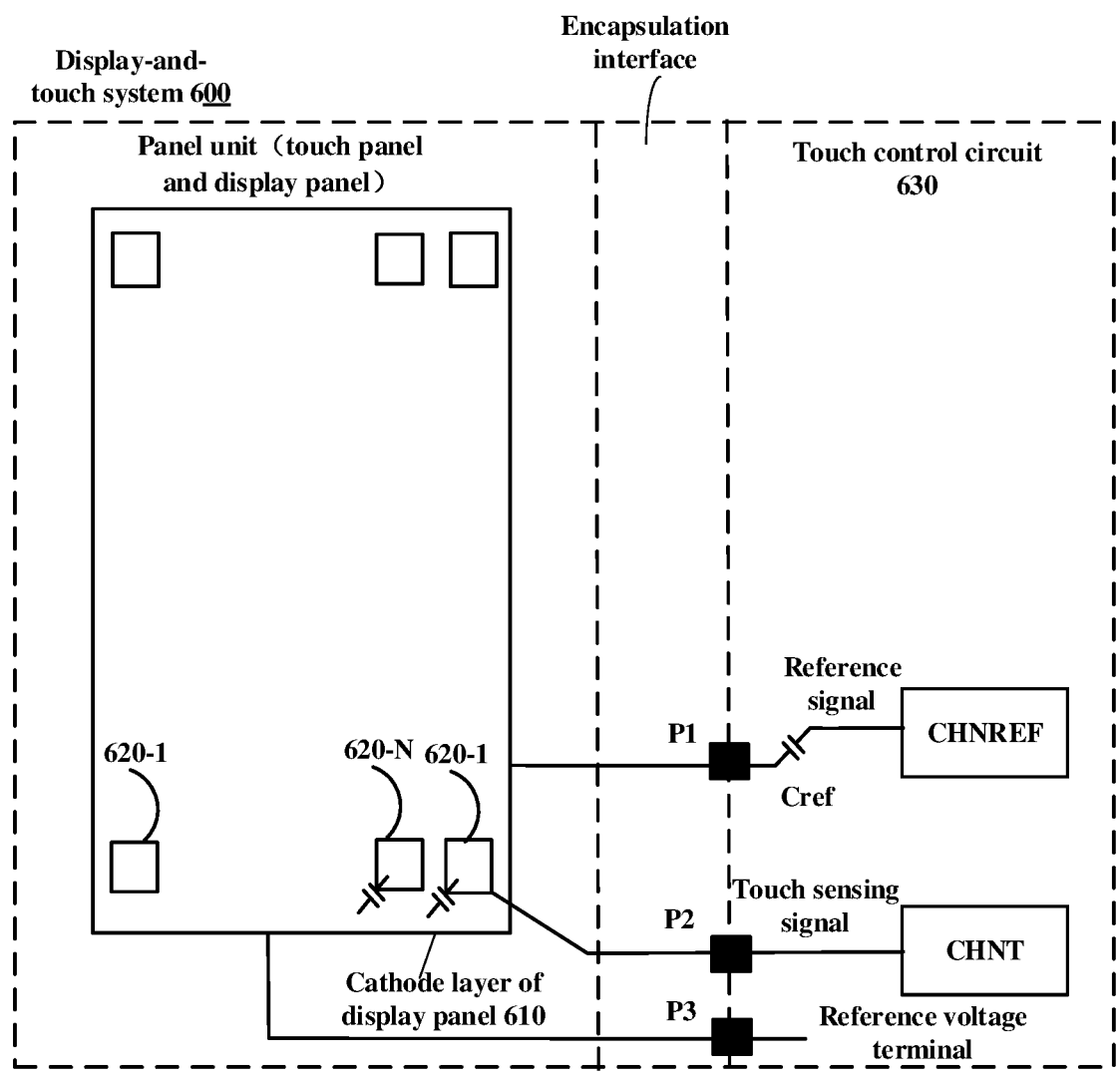
FIGS. 6 to 7 further show a schematic structural diagram of the display-and-touch system shown in FIG. 5, wherein the interference sensing capacitor is included in the touch control circuit included in the display-and-touch system.
Figure 7:
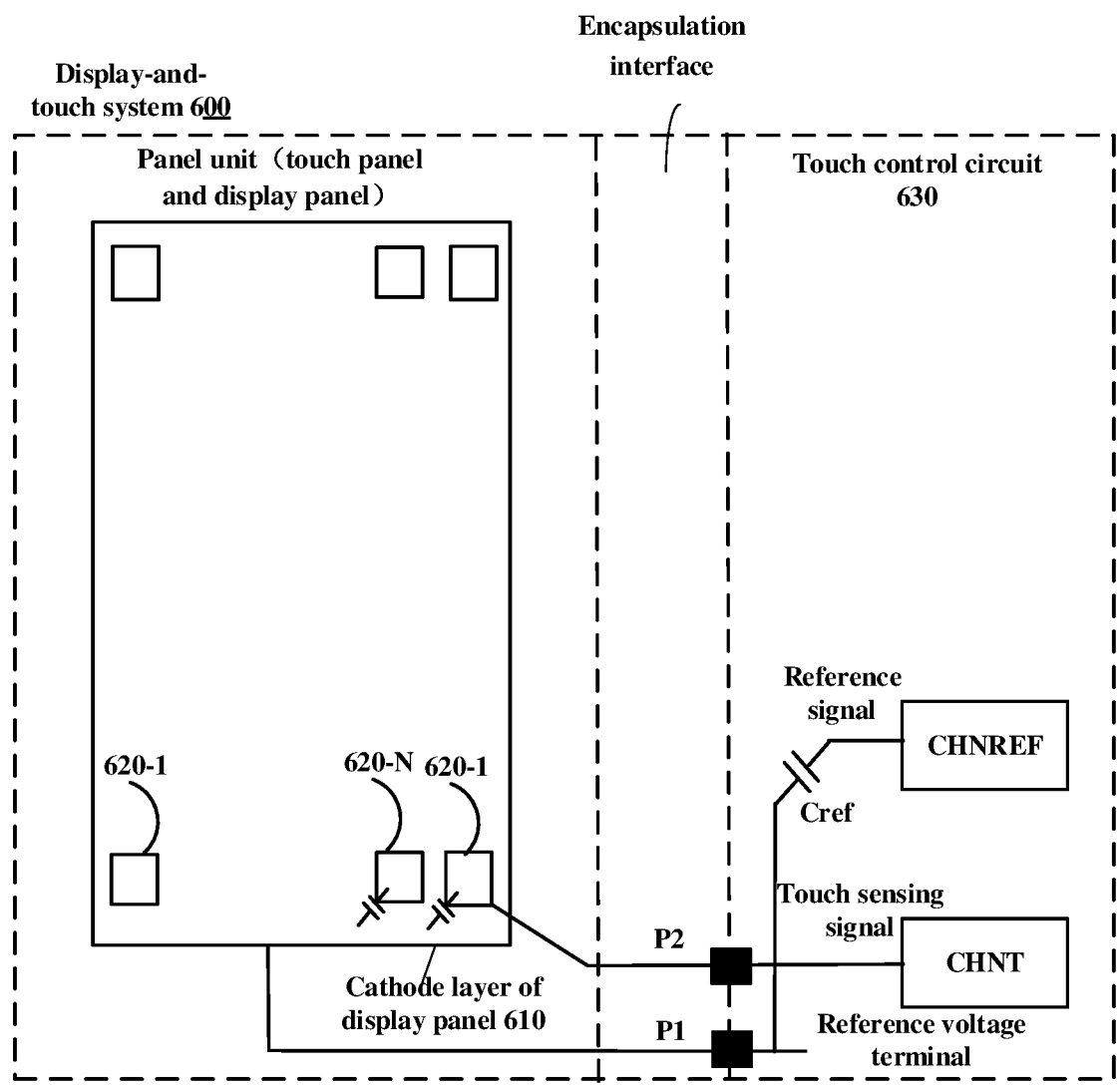

FIGS. 6 to 7 show a schematic structural diagram of the display-and-touch system according to the embodiment of the present application, wherein the interference sensing capacitor and the touch control circuit of the display-and-touch system are integrated in one chip, so the interference sensing capacitor may be regarded as being included in the touch control circuit included in the display-and-touch system.

As shown in FIG. 6, the touch control circuit 630 of the display-and-touch system 600 may include: at least one interference sensing capacitor Cref, at least one interference sensing channel CHNREF and a plurality of touch sensing channels CHNT. Optionally, the display panel 610 is an OLED display panel, and one of the cathode layer and the anode layer of the display panel 610 which is closer to the touch panel is an interference layer of the display panel 610 with regard to the touch panel. That is to say, a parasitic capacitor is formed between the interference layer of the display panel 610 and each touch sensor, so that the interference (coupling noise) from the interference layer can be transmitted to the touch sensor via the parasitic capacitor, which will thereby affect the touch sensing signal received by the touch control circuit from the touch sensor.

More details of the at least one interference sensing capacitor Cref, the at least one interference sensing channel CHNREF and the plurality of touch sensing channels CHNT have been described with reference to FIG. 5 in the above, thus no repetition is made herein.

More specifically, in order to realize the connection of the touch control circuit 630 with the display panel 610 and the touch panel 620, the touch control circuit 630 may include at least one first port P1, at least one second port P2 and at least one third port P3 as shown in FIG. 6, these ports are part of a plurality of connection ports of the chip where the touch control circuit 630 is located, and the chip where the touch control circuit 630 is located is connected with an encapsulation interface in the display-and-touch system 600 through the plurality of connection ports. Connection lines between the panel unit and the chip where the touch circuit is located can be provided on the encapsulation interface.

Optionally, the at least one first port P1 is connected with the interference layer of the display panel, the first electrode of each interference sensing capacitor is connected with a corresponding first port, and the second electrode of the interference sensing capacitor is connected with a corresponding interference sensing channel.

As shown in FIG. 6, the first side (the side outside the chip where the touch control circuit 630 is located or the side closer to the display panel and the touch panel) of the at least one first port P1 of the touch control circuit 630 is connected to the interference layer of the display panel 610 through a connecting line, the first electrode of each interference sensing capacitor Cref is connected to the second side (the side inside the chip where the touch control circuit 630 is located or the side farther away from the display panel and the touch panel) of a corresponding first port P1, and the second electrode thereof is connected to a corresponding interference sensing channel CHNREF. Hereinafter, the first side and the second side of each port are similarly defined relative to the chip.

In FIG. 6, for the convenience of description, only one first port P1 connected to the first electrode of one interference sensing capacitor Cref is shown, but it should be understood that the number of the first ports P1 may be more, and a same one first port P1 may be connected to the first electrodes of multiple interference sensing capacitors Cref, e.g., through a switching module and in a time-division manner or simultaneously, the present disclosure makes no limitation thereto.

In addition, the at least one second port P2 (e.g., the first side thereof) of the touch control circuit 630 is connected with the plurality of touch sensors of the touch panel 620 through connecting lines, and each second port (e.g., the second side thereof) is connected with a corresponding touch sensing channel CHNT through a connecting line. For example, each touch sensing channel CHNT may include an analog front-end circuit.

Similarly, in FIG. 6, for the convenience of description, only one second port P2 connected to the first electrode of one touch sensor and one touch sensing channel is shown, but it should be understood that the number of the second port P2 may be more, and the same one second port P2 may be connected to multiple touch sensors and/or to multiple touch sensing channels, e.g., through a switching module and in a time-division manner respectively, the present disclosure makes no limitation thereto.

In addition, the pixel circuit in the display panel requires various types of voltage signals at the time of light-emitting displaying, such as the voltage required by the cathode layer of the OLED display panel and the voltage signal required by the anode layer of the OLED display panel. Thus, the touch control circuit 630 may further include a power supply circuit for providing these voltage signals to the display panel 610. Thus, at least one third port P3 of the touch control circuit 630 may be used to provide these voltage signals to the display panel. Of course, these voltage signals may also be provided to the display panel through a power supply circuit independent of the driver IC where the touch control circuit 630 is located, such as a power management IC.

Optionally, in the case where the touch control circuit 630 includes the power supply circuit, one third port P3 (also referred to as power supply port) may be connected to the interference layer of the display panel 610, and connected to the reference voltage terminal of the power supply circuit included in the touch control circuit 630.

For example, in the case where the touch control circuit 630 includes the power supply circuit, the first side (the side outside the chip where the touch control circuit 630 is located) of one third port P3 (also referred to as power supply port) may be connected to the interference layer of the display panel 610 through a connecting line, and the second side (the side inside the chip where the touch control circuit 630 is located) of the one third port may be connected to the reference voltage terminal of the power supply circuit included in the touch control circuit 630 through a connecting line, so as to provide the interference layer of the display panel 610 with a first DC voltage signal having a first voltage value (e.g., 5V) or a second DC voltage signal having a second voltage value (e.g., 0V) smaller than the first voltage value. For example, one third port P3 may be connected to the interference layer of the display panel 610, so as to provide a second DC voltage signal with a second voltage value (e.g., 0V) from the touch control circuit 630 to the interference layer. The voltage required by the cathode layer of the OLED display panel is smaller than that required by the anode layer of the OLED. In the case where the display panel 610 is an OLED display panel and the interference layer is the cathode layer, the first side of the third port P3 may be connected with the cathode layer of the display panel 610 through a connecting line, and the second side of the third port may be connected with the reference voltage terminal of the power supply circuit included in the touch control circuit 630 through a connecting line, so as to provide the second DC voltage signal with the second voltage value (e.g., 0V) from the touch control circuit 630 to the cathode layer. Similarly, in the case where the display panel 610 is an OLED display panel and the interference layer is an anode layer, the touch control circuit 630 may provide the first DC voltage signal with the first voltage value (e.g., 5V) to the anode layer via the third port P3.

In other embodiments, the arrangement manner of the interference sensing capacitor disposed in the touch control circuit 630 and the ports included by the touch control circuit may be different from the embodiment shown in FIG. 6.

As shown in FIG. 7, similarly, the touch control circuit 630 similarly includes at least one interference sensing capacitor Cref, at least one interference sensing channel CHNREF and a plurality of touch sensing channels CHNT, the details of which are similar to those described above with reference to FIG. 6.

As shown in FIG. 7, the touch control circuit may include a power supply circuit and at least one first port P1 (also referred to as power supply port), which is used to provide the interference layer of the display panel with a voltage signal required by pixel circuits at the time of displaying.

Optionally, in the case where the touch control circuit 630 includes the power supply circuit, a power supply port is connected with the reference voltage terminal of the power supply circuit, the first electrode of each interference sensing capacitor is connected with the power supply port, and the second electrode of the interference sensing capacitor is connected with a corresponding interference sensing channel; wherein the power supply circuit is used to provide a first DC voltage signal or a second DC voltage signal to the interference layer of the display panel via the reference voltage terminal and the power supply port, wherein a voltage value of the first DC voltage signal is greater than that of the second DC voltage signal.

For example, as shown in FIG. 7, the first side (the side outside the chip where the touch control circuit 630 is located) of a first port P1 of the touch control circuit 630 may be connected to the interference layer of the display panel 610 through a connecting line, and the second side (the side inside the chip where the touch control circuit 630 is located) of the first port P1 may be connected to the reference voltage terminal of the power supply circuit included in the touch control circuit 630 through a connecting line, so as to provide the interference layer of the display panel 610 with a first DC voltage signal with a first voltage value (e.g., 5V) or a second DC voltage signal with a second voltage value (e.g., 0V) smaller than the first voltage value. For example, in the case where the display panel 610 is an OLED display panel and the interference layer is a cathode layer, the first port P1 may be connected to the cathode layer to provide the second DC voltage signal with the second voltage value (e.g., 0V) from the touch control circuit 630 to the cathode layer. Similarly, in the case where the display panel 610 is an OLED display panel and the interference layer is the anode layer, the first port P1 may be connected to the anode layer to provide the first DC voltage signal with the first voltage value (e.g., 5V) from the touch control circuit 630 to the anode layer. In addition, the first electrode of each interference sensing capacitor Cref is connected to the first port P1 at the second side of the first port P1 (the side inside the chip where the touch control circuit 630 is located), and the second electrode of each interference sensing capacitor Cref is connected to a corresponding sensing channel CHNREF.

In addition, the touch control circuit 630 also has at least one second port P2, which is connected with the touch sensors on the touch sensing layer and corresponding touch sensing channels CHNT. In this way, both the interference sensing capacitor and the touch sensors are coupled to the interference layer of the display panel, so they can also bear basically the same interference (coupling noise) from the interference layer of the display panel.

In this way, based on the display-and-touch system described in FIGS. 6 to 7, by arranging the interference sensing capacitor in the touch control circuit, the interference sensing capacitor can transmit noise (interference) from the interference layer of the display panel and is insensitive to the interference caused by touch on the touch panel and other interference other than the interference from the interference layer of the display panel, so the interference sensing signal received from the interference sensing capacitor Cref will change almost only according to the interference (coupling noise) from the interference layer of the display panel. Therefore, the interference sensing signal can be better used as the reference signal for noise elimination, thus accuracy of the touch sensing result is improved.

FIGS. 8 to 12 show schematic structural diagrams of a display-and-touch system according to an embodiment of the present application, wherein the interference sensing capacitor is arranged outside the chip where the touch control circuit included in the display-and-touch system is located.

Figure 8:
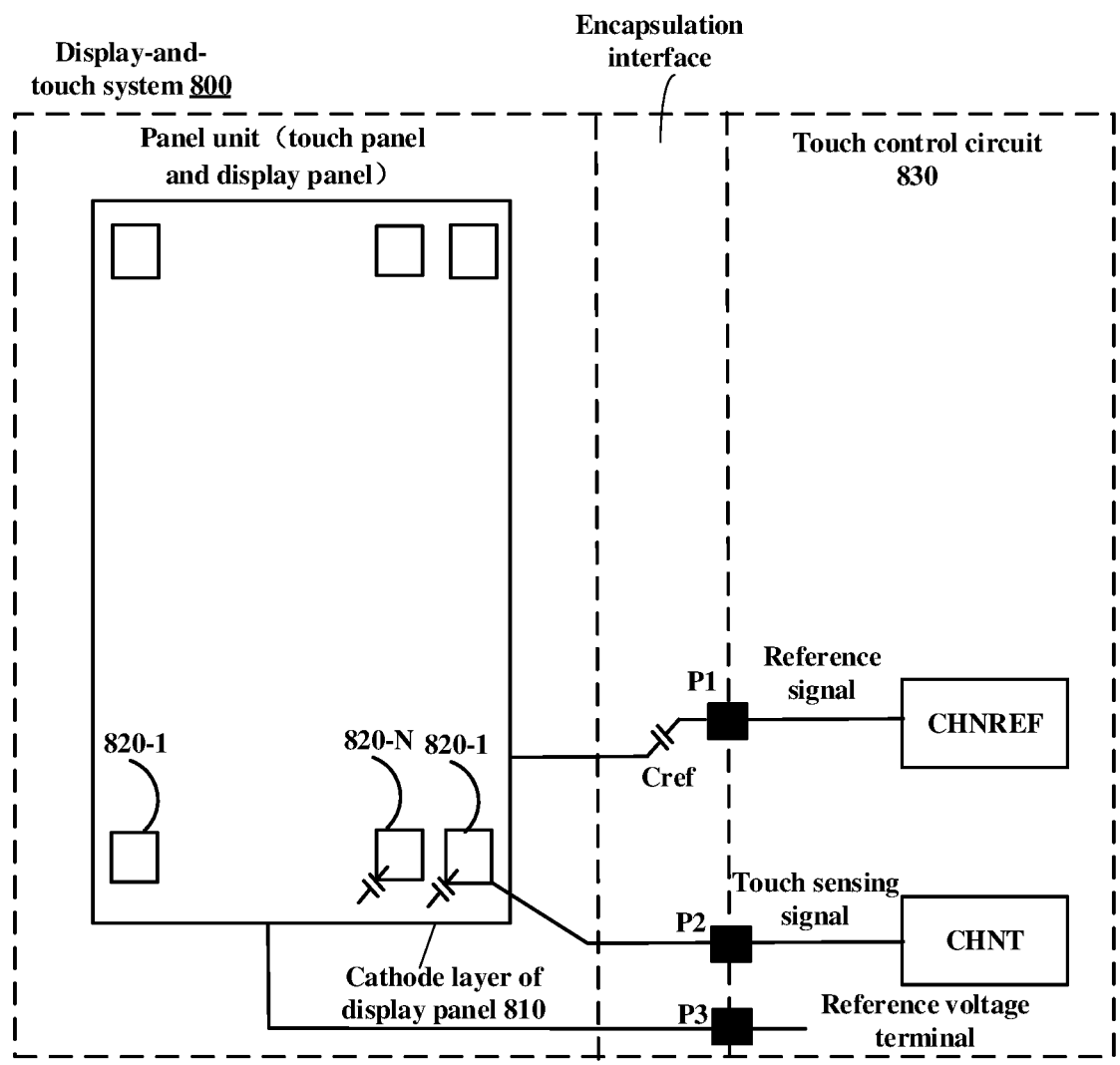
FIGS. 8 to 9 further show a structural schematic diagram of the display-and-touch system shown in FIG. 5, wherein the interference sensing capacitor is arranged in the encapsulation interface.

As shown in FIG. 8, the display-and-touch system 800 includes a display panel 810, a touch panel 820, a touch control circuit 830 and at least one interference sensing capacitor Cref.

Similarly, the at least one interference sensing capacitor Cref may be configured at a position insensitive to interference caused by the touch on the touch panel and interference other than the interference from the interference layer of the display panel, such as an encapsulation interface between the panel unit 10 (i.e., the touch panel and the display panel) and the touch control circuit 830 shown in FIG. 8, so as to be insensitive to these interferences, wherein the first electrode of each interference sensing capacitor is connected to the interference layer of the display panel, and the second electrode thereof is used to output an interference sensing signal (i.e., the reference signal). For example, since the first electrode of each interference sensing capacitor Cref is connected to the interference layer of the display panel, noise (interference) from the interference layer of the display panel can be transmitted, and since the interference sensing capacitor Cref is disposed on the encapsulation interface, it will not be sensitive to the interference caused by the touch on the touch panel and interference from other interference sources such as touch by other objects, water, chargers or high-power devices, so these interferences will not cause the change to the interference sensing signal received from the interference sensing capacitor, and this interference sensing signal will change almost only according to the interference (coupling noise) from the interference layer of the display panel.

The touch panel 820 has a plurality of touch sensors. Optionally, the plurality of touch sensors may be arranged in an array.

The touch control circuit 830 may include: at least one interference sensing channel CHNREF and a plurality of touch sensing channels CHNT.

At least one interference sensing channel CHNREF in the touch control circuit 830 may be configured to receive an interference sensing signal from the at least one interference sensing capacitor Cref outside the touch control circuit 830 (that is, outside the chip where the touch control circuit 830 is located). For example, the second electrode of each interference sensing capacitor is connected to a corresponding one interference sensing channel CHNREF, that is, the interference sensing capacitor is connected between the interference layer of the display panel and the corresponding one interference sensing channel CHNREF. For example, each interference sensing channel CHNREF may include an analog front-end circuit.

Figure 9:
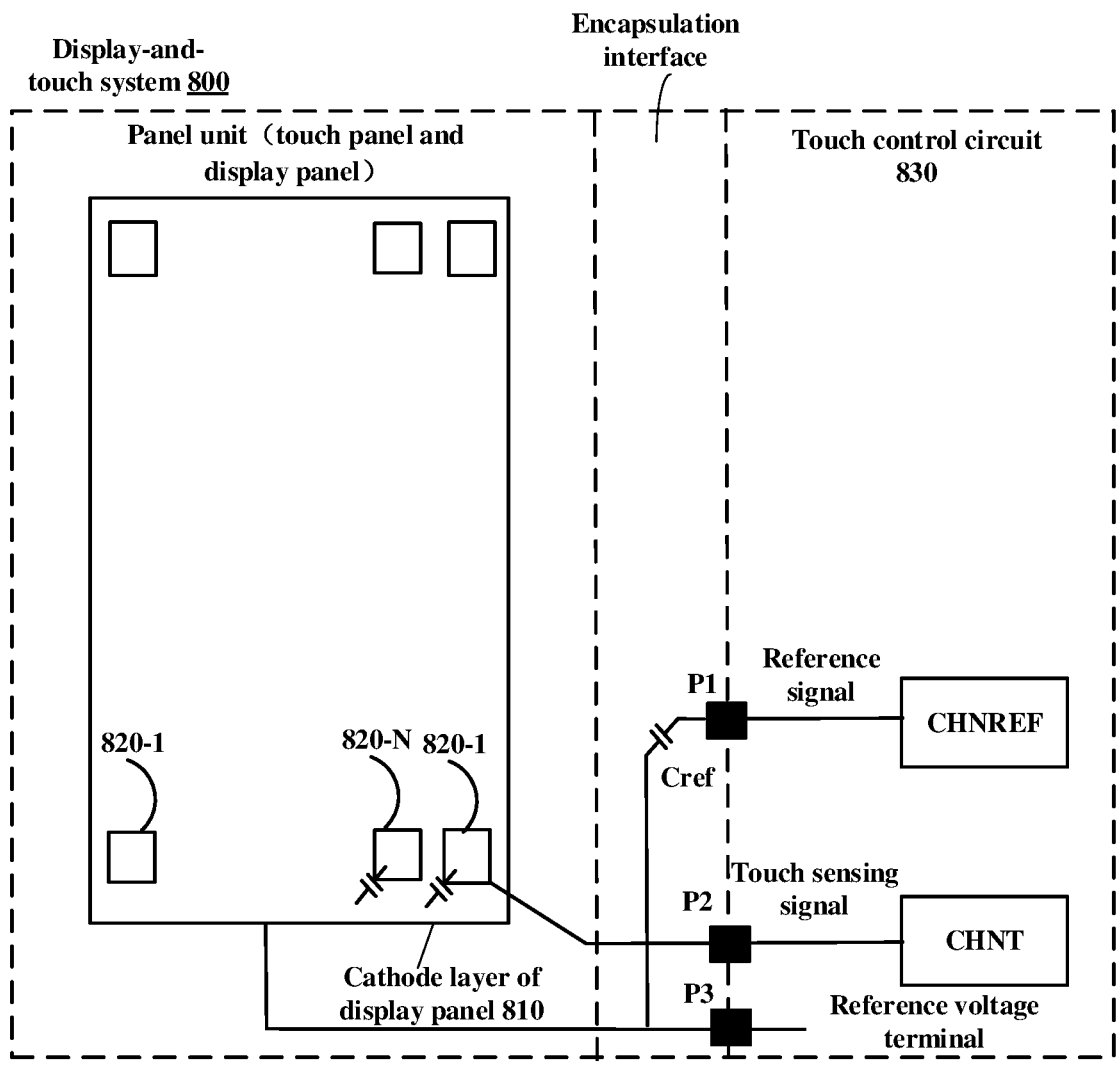

In some embodiments, when the at least one interference sensing capacitor is arranged outside the chip where the touch control circuit included in the display-and-touch system is located, as shown in FIGS. 8 to 9, the at least one interference sensing capacitor Cref may be arranged in the encapsulation interface between the panel unit 10 (i.e., the touch panel and the display panel) and the touch control circuit 830, and the at least one interference sensing capacitor Cref each may be an independent capacitor or a capacitor of the encapsulation interface per se.

Optionally, the encapsulation interface is a bearing board used for chip or IC encapsulation. Taking Chip On Film (COF) encapsulation as an example, the encapsulation interface may be a flexible printed circuit board (FPC); taking Chip On Glass (COG) encapsulation as an example, the encapsulation interface may be a glass substrate of the display panel. Taking Chip On Plastic (COP) encapsulation as an example, the encapsulation interface may be a plastic substrate of the display panel, the present disclosure makes no limitation to type and material of the encapsulation interface.

In some embodiments, as shown in FIG. 8, the touch control circuit 830 may have at least one first port P1, and the at least one first port P1 (e.g., the second side thereof) is connected with at least one corresponding interference sensing channel. The first electrode of each interference sensing capacitor Cref is connected to the interference layer of the display panel 810, and the second electrode thereof is connected to a corresponding first port P1 (e.g., the first side thereof), and then connected to a corresponding interference sensing channel CHNREF via the corresponding first port P1.

In addition, similarly, the touch control circuit 830 may also have at least one second port P2, which is used to connect with the touch sensors on the touch panel (e.g., on the first side) and to connect with corresponding touch sensing channels CHNT (e.g., on the second side).

Additionally, since the pixel circuits of the display panel needs to work according to various voltage signals provided by the power supply circuit, a power supply circuit needs to be set. The power supply circuit may have a reference voltage terminal connected to the interference layer of the display panel so as to provide the voltage signal required by the interference layer for providing to the pixel circuits, and the power supply circuit may be included in the touch control circuit 830.

The touch control circuit 830 may also have at least one third port P3 (also referred to as power supply port), which is used to respectively provide voltage signals required by the pixel circuits for displaying to the interference layer of the display panel. As shown in FIG. 8, the third port P3 (e.g., the first side thereof) is connected to the interference layer of the display panel 810, and the third port P3 (e.g., the second side thereof) is connected to the reference voltage terminal of the power supply circuit. The power supply circuit is used to provide a first DC voltage signal or a second DC voltage signal to the interference layer of the display panel (to provide to the pixel circuits) via the reference voltage terminal and the third port, wherein the voltage value of the first DC voltage signal is greater than that of the second DC voltage signal. For example, the first DC voltage signal is 5V, and the second DC voltage signal is 0V.

Optionally, the display panel is an OLED display panel, and the interference layer is one of the cathode layer and the anode layer of the OLED display panel which is closer to the touch panel. When the interference layer is the cathode layer of the OLED display panel, the reference voltage terminal is used to provide the second DC voltage signal, or when the interference layer is the anode layer of OLED display panel, the reference voltage terminal is used to provide the first DC voltage signal.

In other embodiments, ports and the interference sensing capacitor may be arranged in different ways. As shown in FIG. 9, the touch control circuit 830 has at least one first port P1, each first port P1 (e.g., the first side thereof) is connected with the second electrode of a corresponding interference sensing capacitor, and the first port P1 (e.g., the second side thereof) is connected with a corresponding interference sensing channel CHNREF.

Similarly, the touch control circuit 830 may also have at least one second port P2, which is used to connect with touch sensors on the touch panel (e.g., on the first side) and corresponding touch sensing channels CHNT (e.g., on the second side).

In addition, the touch control circuit 830 may also have one third port P3 (also referred to as power supply port), the third port P3 (e.g., the first side thereof) is connected to the interference layer of the display panel 810, and the third port P3 (e.g., the second side thereof) is connected to the reference voltage terminal of the power supply circuit in the touch control circuit 830. The first electrode of each interference sensing capacitor Cref is connected to the reference voltage terminal via the third port P3, and the second electrode of each interference sensing capacitor Cref is connected to a corresponding first port P1. For example, the first electrode of each interference sensing capacitor Cref is connected, via a connecting line on the encapsulation interface, to a connection line that is on the encapsulation interface and connects the interference layer with the third port, and thus the first electrode of each interference sensing capacitor Cref is connected to the first side of the third port P3 and to the interference layer, and connected to the reference voltage terminal of the power supply circuit included in the touch control circuit 830 via the third port P3, and the second electrode of each interference sensing capacitor Cref is connected to a corresponding first port P1.

Figure 10:
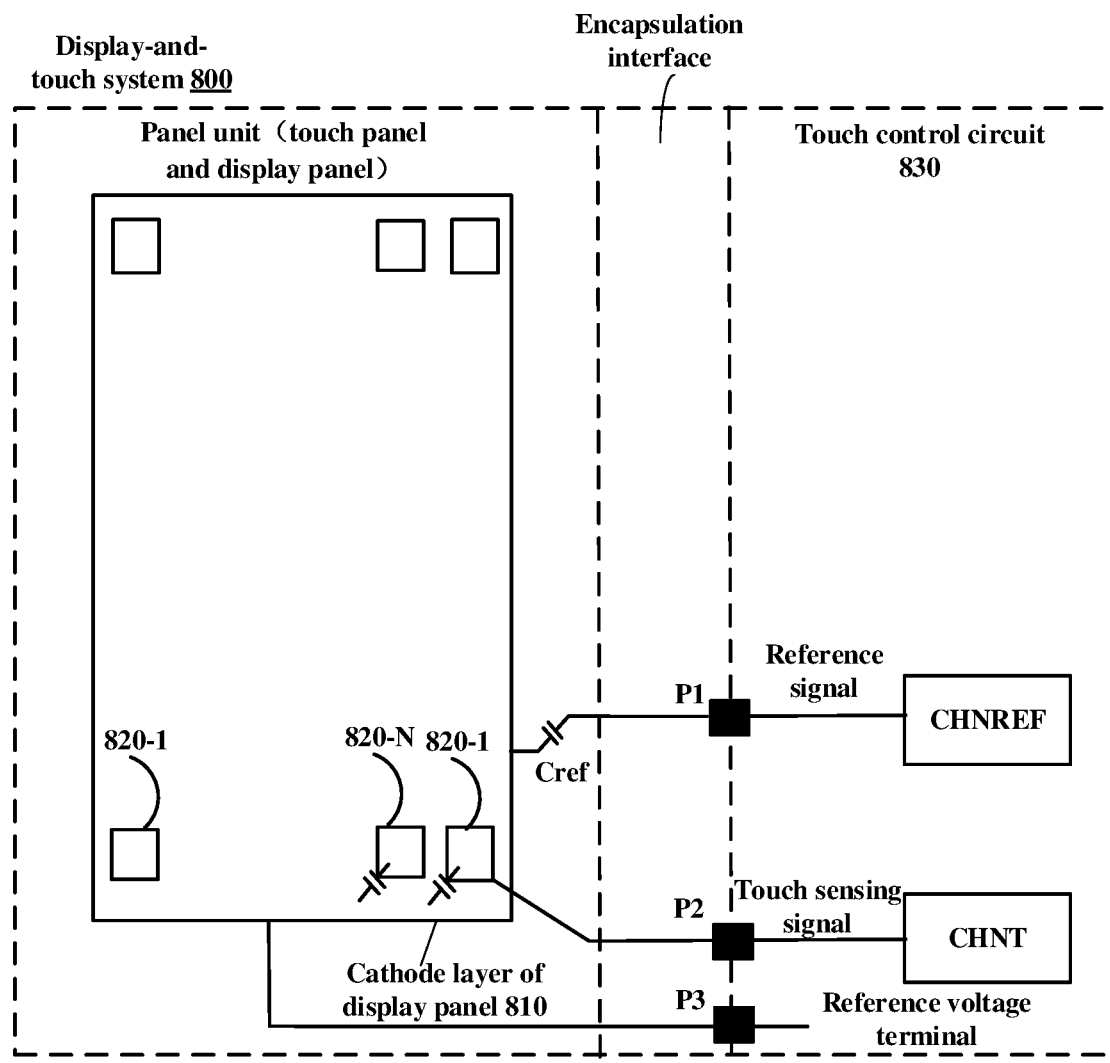
FIGS. 10 to 11 further show a schematic structural diagram of the display-and-touch system shown in FIG. 5, wherein the interference sensing capacitor is arranged in the display panel.
Figure 11:
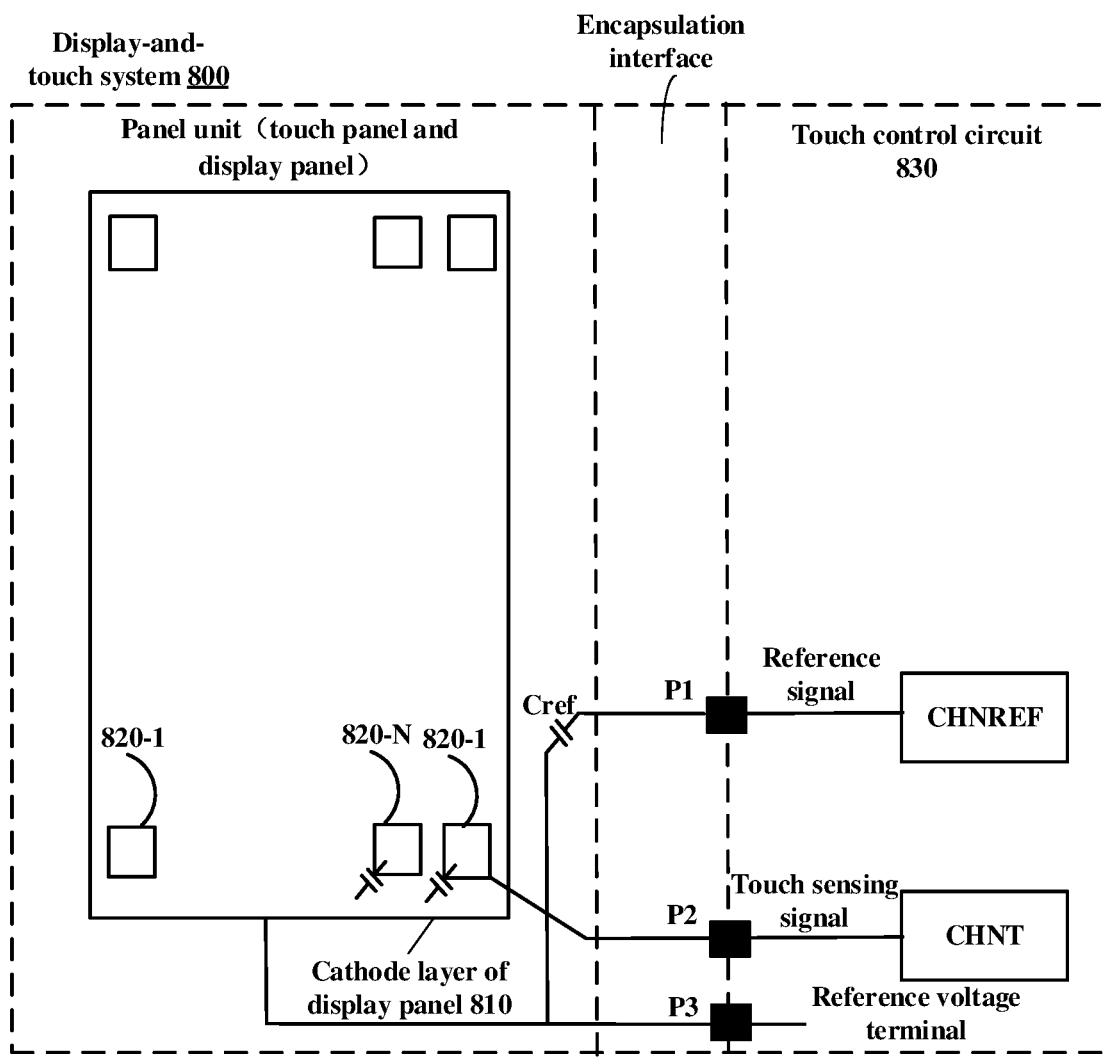

In other embodiments, in the case where the at least one interference sensing capacitor Cref is arranged outside the chip where the touch control circuit included in the display-and-touch system is located, as shown in FIGS. 10 to 11, the at least one interference sensing capacitor Cref may be arranged in the display panel 810 or a non-touch area of the touch panel, for example, arranged in the area outside the touch area where the plurality of the touch sensors included in the touch sensing layer are located on the display panel, e.g., an area that is not overlapped with the touch area, and the at least one interference sensing capacitor Cref is an independent capacitor.

In this case, like in FIGS. 8 to 9, the touch control circuit 830 may also include corresponding ports.

For example, as shown in FIG. 10, the touch control circuit 830 has at least one first port P1, each first port (e.g., the first side thereof) is connected with the second electrode of a corresponding interference sensing capacitor Cref, and the first port (e.g., the second side thereof) is connected with a corresponding interference sensing channel; the first electrode of each interference sensing capacitor Cref is connected to the interference layer of the display panel 810, and the second electrode thereof is connected to a corresponding first port, and then connected to a corresponding interference sensing channel CHNREF via the corresponding first port.

The touch control circuit 830 may also have at least one second port P2, which is used to connect with the touch sensors on the touch panel (e.g., on the first side) and corresponding touch sensing channels CHNT (e.g., on the second side).

The touch control circuit 830 may also have one third port P3 (also referred to as power supply port), the third port P3 (e.g., the first side thereof) is connected to the interference layer of the display panel 810, and the third port (e.g., the first side thereof) is connected to the reference voltage terminal of the power supply circuit.

Alternatively, as shown in FIG. 11, the touch control circuit has at least one first port P1, each first port P1 (e.g., the first side thereof) is connected with the second electrode of a corresponding interference sensing capacitor, and the first port (e.g., the second side thereof) is connected with a corresponding interference sensing channel CHNREF.

The touch control circuit 830 may also have at least one second port P2, which is used to connect with the touch sensors on the touch panel (e.g., on the first side) and connect with corresponding touch sensing channels CHNT (e.g., on the second side thereof).

The touch control circuit 830 may also have one third port P3 (also referred to as power supply port), the third port P3 (e.g., the first side thereof) is connected to the interference layer of the display panel 810, and the third port (e.g., the first side thereof) is connected to the reference voltage terminal of the power supply circuit. The first electrode of each interference sensing capacitor Cref is connected to the first side of the third port, so as to be connected to the reference voltage terminal of the power supply circuit included in the touch control circuit 830 via the third port P3, and the second electrode of the interference sensing capacitor Cref is connected to a corresponding first port P1.

Optionally, the display panel is an OLED display panel, and the interference layer is one of the cathode layer and the anode layer of the OLED panel that is closer to the touch panel. In FIGS. 10 to 11, when the interference layer is the cathode layer of OLED display panel, the reference voltage terminal is used to provide the second DC voltage signal (e.g., 0V), or when the interference layer is the anode layer of OLED display panel, the reference voltage terminal is used to provide the first DC voltage signal (e.g., 5V).

In yet other embodiments, in the case where the at least one interference sensing capacitor Cref is arranged outside the touch control circuit included in the display-and-touch system, the at least one interference sensing capacitor Cref is the capacitor between at least one interference sensor in the touch panel and the interference layer of the display panel, respectively. Optionally, the at least one interference sensor and the plurality of touch sensors are arranged together in an array in the touch panel.

Figure 12:
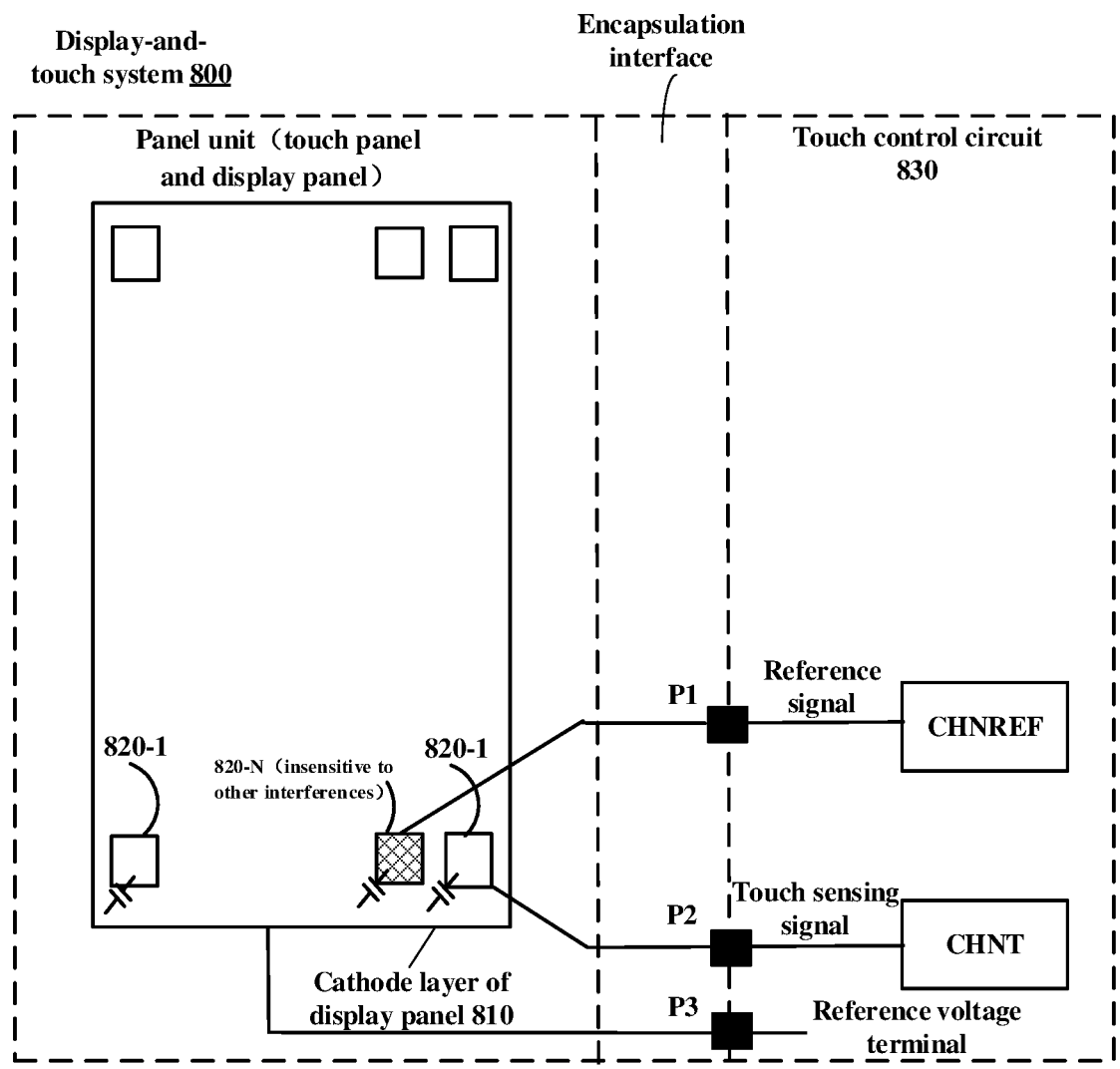
FIG. 12 further shows a schematic structural diagram of the display-and-touch system shown in FIG. 5, wherein an interference sensing capacitor is arranged in the touch panel.

As shown in FIG. 12, a touch panel for a display-and-touch system may include: a plurality of touch sensors and at least one interference sensor. Optionally, the plurality of touch sensors and the at least one interference sensor may be arranged in an array.

Similarly, each touch sensor is used to provide a touch sensing signal to the touch control circuit, and there is parasitic capacitor between each touch sensor and the interference layer of the display panel, and each touch sensor is connected with a corresponding touch sensing channel in the touch control circuit; each interference sensor is used to provide an interference sensing signal to the touch control circuit, and there is a parasitic capacitor between each interference sensor and the interference layer of the display panel, serving as the interference sensing capacitor; each interference sensor is connected with a corresponding interference sensing channel in the touch control circuit, and each interference sensing capacitor is insensitive to the touch on the touch panel and the interference other than the interference from the interference layer.

Optionally, in the display-and-touch system in various embodiments of the present application, the parasitic capacitor between each touch sensor and the interference layer of the display panel may be used as the self-capacitor based on which each touch sensor performs touch sensing.

In the arrangement manner of FIG. 12, the interference sensor is not used for touch sensing, thus it may be arranged near a boundary of the touch area, and an operation such as shielding may be performed thereto, so as to make the interference capacitor corresponding to the interference sensor insensitive to the touch on the touch panel and the interference from other interference sources as described above. Accordingly, even though this arrangement manner of the interference sensor will slightly affect touch sensing at the boundary, because the number of interference sensors may be relatively small, and these areas for arranging the interference sensors are generally areas with low frequency of touch events, so the purpose of providing high-accuracy touch sensing results can be achieved by sacrificing a small amount of touch sensing resolution, and the process is relatively simple and acceptable.

Alternatively, the interference sensors may be arranged in a different layer (not shown) from the layer (touch sensing layer) of the plurality of touch sensors in the touch panel, and an operation such as shielding may be performed thereto, so as to make the interference capacitor corresponding to the interference sensor insensitive to the touch on the touch panel and the interference from other interference sources as described above, thus the purpose of providing high-accuracy touch sensing results is achieved without affecting the touch sensing resolution.

In this way, based on the display-and-touch system described in FIGS. 8 to 12, the interference sensing capacitor can transmit the noise (interference) from the interference layer of the display panel and is insensitive to the interference caused by the touch on the touch panel and other interference other than the interference from the interference layer of the display panel. Thus, the interference sensing signal received from the interference sensing capacitor Cref will almost only change according to the interference (coupling noise) from the interference layer of the display panel, so the interference sensing signal may be better used as the reference signal for noise elimination. In addition, the interference sensing capacitor can be arranged in the encapsulation interface, so that the structure of the currently used touch control circuit does not need to be modified too much, meanwhile the size of the touch control circuit can be reduced and it is convenient to replace etc.

In other embodiments, the interference layer of the display panel as described in FIGS. 6 to 12 can be connected to the power supply port of the touch circuit to receive the voltage signal(s) generated by the power supply circuit included in the touch circuit, and can also be connected to a power supply circuit (referred to as external power supply circuit) independent of the chip where the touch control circuit is located, such as another power management chip. The external power supply circuit can provide voltage signals (such as the aforementioned first/second DC voltage signals) to the interference layer of the display panel. Therefore, the display-and-touch system can be designed to optionally use the power supply circuit of the touch circuit to generate and provide voltage signal(s) to the interference layer of the display panel in some modes or situations, and use the external power supply circuit to generate and provide voltage signals to the interference layer of the display panel in other modes or situations.

According to another aspect of the application, a touch sensing method for a display-and-touch system is also provided.

Figure 13:
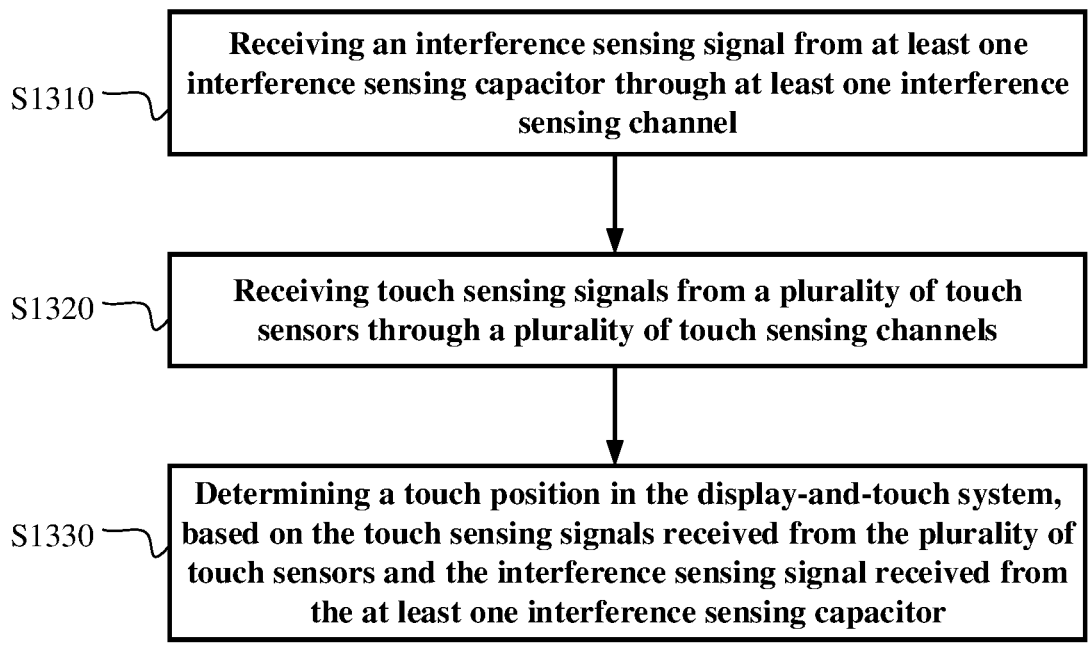
FIG. 13 shows a flowchart of a touch sensing method for a display-and-touch system according to an embodiment of the present application.

FIG. 13 shows a flowchart for a touch sensing method used in a display-and-touch system according to an embodiment of the present application. The touch sensing method may be used in the display-and-touch system as described above with reference to FIGS. 5 to 12. For example, such a display-and-touch system may include a display panel, a touch panel, a touch control circuit, and at least one interference sensing capacitor, and the touch panel has a plurality of touch sensors, and the touch control circuit includes a plurality of touch sensing channels and at least one interference sensing channel. The at least one interference sensing capacitor is insensitive to interference caused by touch on the touch panel and interference other than interference from the interference layer of the display panel, and the first electrode of each interference sensing capacitor is connected with the interference layer of the display panel, and the second electrode thereof is connected with an interference sensing channel corresponding to the interference sensing capacitor.

Optionally, the at least one interference sensing capacitor is integrated with the touch control circuit in one chip, and the at least one interference sensing capacitor is an independent capacitor or an existing capacitor in its corresponding interference sensing channel, as described above with reference to FIGS. 6 to 7.

Optionally, the at least one interference sensing capacitor is located in the encapsulation interface between the panel unit (the touch panel and the display panel) and the touch control circuit, and the at least one interference sensing capacitor is an independent capacitor or a capacitor of the encapsulation interface per se, as described above with reference to FIGS. 8 to 9.

Optionally, the at least one interference sensing capacitor is located in an area outside the touch area where the plurality of touch sensors are located in the display panel, and the at least one interference sensing capacitor is an independent capacitor, as described above with reference to FIGS. 10 to 11.

Optionally, the at least one interference sensing capacitor is the capacitor between at least one interference sensor and the interference layer of the display panel, and the at least one interference sensor and the plurality of touch sensors are arranged together in an array in the touch panel, as described above with reference to FIG. 12.

As shown in FIG. 13, in step S1310, an interference sensing signal is received from at least one interference sensing capacitor through at least one interference sensing channel.

For example, the first electrode of each interference sensing capacitor is connected to the interference layer of the display panel, and the second electrode thereof is connected to an interference sensing channel corresponding to the interference sensing capacitor, so the display noise from the interference layer of the display panel (e.g., the cathode layer or the anode layer of OLED display panel) will be transmitted to the interference sensing channel through the interference sensing capacitor, that is, the interference sensing signal received by the interference sensing channel includes the information of the display noise from the interference layer of the display panel.

At step S1320, touch sensing signals are received from a plurality of touch sensors through a plurality of touch sensing channels.

For example, because there is a parasitic capacitor between the interference layer of the display panel and each touch sensor, the display noise from the interference layer of the display panel (e.g., the cathode layer or the anode layer of the OLED display panel) will also be transmitted to the touch sensing channel through this parasitic capacitor, that is, the touch sensing signal received by the touch sensing channel includes the information of the display noise from the interference layer of the display panel.

At step S1330, a touch position in the display-and-touch system is determined based on the touch sensing signals received from the plurality of touch sensors and the interference sensing signal received from the at least one interference sensing capacitor.

For example, subtraction may be performed on each touch sensing signal and a corresponding one interference sensing signal, so as to obtain an electrical signal in which the display noise from the interference layer of the display panel (e.g., the cathode layer or the anode layer of the OLED display panel) is eliminated or reduced, and the capacitor change amount at touch sensors may be obtained accordingly, so that the touch position may be determined.

In this way, with the touch sensing method described with reference to FIG. 13, the interference sensing capacitor insensitive to the interference caused by the touch on the touch panel and other interference other than the interference from the interference layer of the display panel is utilized, so the interference sensing signal received from the interference sensing capacitor Cref will change almost only according to the interference (coupling noise) from the interference layer of the display panel, thus the interference sensing signal can be better used as the reference signal for noise cancellation, thereby accuracy of the touch sensing result is improved.

According to another aspect of the application, the embodiment of the application further provides a touch control circuit for a display-and-touch system, the touch control circuit may be the touch control circuit 630 used in the display-and-touch system described with reference to FIGS. 5 to 7.

For example, the touch control circuit may include at least one interference sensing capacitor Cref, at least one interference sensing channel CHNREF and a plurality of touch sensing channels CHNT.

The at least one interference sensing capacitor Cref may be configured to be insensitive to interference caused by touch on the touch panel and interference other than interference from the interference layer of the display panel, wherein the first electrode of each interference sensing capacitor is connected with the interference layer of the display panel, and the second electrode thereof is used to output the interference sensing signal (i.e., the reference signal).

The at least one interference sensing channel CHNREF may be configured to receive the interference sensing signal from at least one interference sensing capacitor. For example, the second electrode of each interference sensing capacitor is connected to a corresponding one interference sensing channel CHNREF. For example, each interference sensing channel CHNREF may include an analog front-end circuit.

In addition, the plurality of touch sensing channels CHNT may be configured to receive touch sensing signals from at least part of the touch sensors included in the touch sensing layer.

Optionally, the touch control circuit may be integrated into one chip, such as a touch chip or a Touch and Display Driver Integrated (TDDI) chip.

More details of the touch control circuit have been described in detail in the touch control circuit 630 in the display-and-touch system described above with reference to FIGS. 5 to 7, no repetition is made herein.

An embodiment of the present application further provides an electronic device, the electronic device includes the display-and-touch system as described above with reference to FIGS. 5 to 12.

By way of example, but not limitation, the electronic devices in the embodiments of the present application may be portable devices or mobile computing devices such as terminal devices, mobile phones, tablet computers, notebook computers, desktop computers, game devices, in-vehicle electronic devices or wearable intelligent devices, and other electronic devices such as electronic databases, automobiles, and Automated Teller Machine (ATMs). The wearable smart devices include functions that are fully featured, with large size, and can be realized without relying on smart phones (such as smart watches or smart glasses), as well as include functions that only focus on a certain type of application function, and need to be used in conjunction with other devices such as smart phones (such as various smart bracelets for monitoring physical signs and smart jewelry).

It should be noted that, on the premise of no conflict, the respective embodiments described in the present application and/or the technical features in the respective embodiment may be arbitrarily combined with each other, and the technical solutions obtained after combination should also fall into the scope of protection of the present application.

It should be understood that the specific examples in the embodiments of the present application are only to help those skilled in the art to better understand the embodiments of the present application, but not to limit the scope of the embodiments of the present application. Those skilled in the art may make various improvements and variations on the basis of the above embodiments, and all these improvements or variations fall within the protection scope of the present application.

The above is only the specific implementation of the present application, but the protection scope of the present application is not limited thereto. Those skilled in the art may easily conceive of changes or substitutions within the technical range disclosed in the present application, which should be covered by the present application. Therefore, the scope protection of the present application should be determined based on the protection scope of the claims.

What is claimed is:

1. A touch control circuit for a display-and-touch system, wherein the display-and-touch system comprises a display panel, a touch panel and the touch control circuit, the touch panel has a plurality of touch sensors, and the touch control circuit comprises:
    at least one interference sensing capacitor configured to be insensitive to a touch on the touch panel and interference other than interference from an interference layer of the display panel;
    at least one interference sensing channel configured to receive an interference sensing signal from the at least one interference sensing capacitor; and
    a plurality of touch sensing channels configured to receive touch sensing signals from at least part of touch sensors of the plurality of touch sensors;
    wherein a first electrode of each interference sensing capacitor is connected with the interference layer of the display panel, and a second electrode of the interference sensing capacitor is connected with a corresponding interference sensing channel;
    wherein, the touch control circuit further comprises a power supply circuit having a reference voltage terminal connected with the interference layer of the display panel,
    the touch control circuit has a power supply port connected with the reference voltage terminal of the power supply circuit, the first electrode of each interference sensing capacitor is connected with the power supply port, and the second electrode of the interference sensing capacitor is connected with a corresponding interference sensing channel.

2. The touch control circuit according to claim 1, wherein the display panel is an OLED panel, and the interference layer is one of a cathode layer and an anode layer of the OLED panel which is closer to the touch panel.

3. The touch control circuit according to claim 1, wherein the touch control circuit including the at least one interference sensing capacitor is integrated in one chip, and the at least one interference sensing capacitor each is an independent capacitor or an existing capacitor in the at least one interference sensing channel.

4. The touch control circuit according to claim 3, wherein wherein the power supply circuit is used to provide a first DC voltage signal or a second DC voltage signal to the interference layer of the display panel via the reference voltage terminal and the power supply port, wherein a voltage value of the first DC voltage signal is greater than that of the second DC voltage signal.

5. The touch control circuit according to claim 4, wherein the display panel is an OLED panel, and the interference layer is one of a cathode layer and an anode layer of the OLED panel which is closer to the touch panel,
    wherein the reference voltage terminal is used to provide the second DC voltage signal when the interference layer is the cathode layer of the OLED panel, or the reference voltage terminal is used to provide the first DC voltage signal when the interference layer is the anode layer of the OLED panel.

6. A display-and-touch system, wherein the display-and-touch system comprises a display panel, a touch panel, a touch control circuit and at least one interference sensing capacitor, wherein the at least one interference sensing capacitor is configured to be insensitive to a touch on the touch panel and interference other than interference from an interference layer of the display panel, the touch panel has a plurality of touch sensors, and the touch control circuit comprises:
 at least one interference sensing channel configured to receive an interference sensing signal from the at least one interference sensing capacitor; and
 a plurality of touch sensing channels configured to receive touch sensing signals from at least part of touch sensors of the plurality of touch sensors;
 wherein a first electrode of each interference sensing capacitor is connected with the interference layer of the display panel, and a second electrode of interference sensing capacitor is connected with a corresponding interference sensing channel;
 wherein, in a case where the at least one interference sensing capacitor is included in the touch control circuit:
 the touch control circuit further comprises a power supply circuit having a reference voltage terminal connected with the interference layer of the display panel, the touch control circuit has a power supply port connected with the reference voltage terminal of the power supply circuit, the first electrode of each interference sensing capacitor is connected with the power supply port, and the second electrode of the interference sensing capacitor is connected with a corresponding interference sensing channel.

7. The display-and-touch system according to claim 6, wherein
 the display panel is an OLED panel, and the interference layer is one of a cathode layer and an anode layer of the OLED panel which is closer to the touch panel.

8. The display-and-touch system according to claim 6, wherein
 the at least one interference sensing capacitor and the touch control circuit together are integrated in one chip, and the at least one interference sensing capacitor each is an independent capacitor or an existing capacitor in the at least one interference sensing channel.

9. The display-and-touch system according to claim 8, wherein the power supply circuit is used to provide a first DC voltage signal or a second DC voltage signal to the interference layer of the display panel via the reference voltage terminal and the power supply port, wherein a voltage value of the first DC voltage signal is greater than that of the second DC voltage signal.

10. The display-and-touch system according to claim 9, wherein the display panel is an OLED panel, and the interference layer is one of a cathode layer and an anode layer of the OLED panel which is closer to the touch panel, wherein the reference voltage terminal is used to provide the second DC voltage signal when the interference layer is the cathode layer of the OLED panel, or the reference voltage terminal is used to provide the first DC voltage signal when the interference layer is the anode layer of the OLED panel.

11. The display-and-touch system according to claim 6, wherein in a case where the at least one interference sensing capacitor is not included in the touch control circuit:
 the at least one interference sensing capacitor is located in an encapsulation interface between the touch panel together with the display panel and the touch control circuit, and the at least one interference sensing capacitor each is an independent capacitor or a capacitor of the encapsulation interface per se; or
 the at least one interference sensing capacitor is located in an area outside a touch area where the plurality of touch sensors are located in the display panel, and the at least one interference sensing capacitor each is an independent capacitor; or
 the at least one interference sensing capacitor each is a capacitor between at least one interference sensor and the interference layer, and the at least one interference sensor and the plurality of touch sensors are arranged in the touch panel.

12. The display-and-touch system according to claim 11, wherein the touch control circuit has at least one first port, and the at least one first port is respectively connected with the at least one interference sensing channel;
 the first electrode of each interference sensing capacitor is connected with the interference layer of the display panel, and the second electrode of the interference sensing capacitor is connected with a corresponding first port.

13. The display touch control system according claim 11, wherein the touch control circuit further comprises a power supply circuit having a reference voltage terminal connected to the interference layer of the display panel,
 the touch control circuit has at least one first port respectively connected with the at least one interference sensing channel;
 the first electrode of each interference sensing capacitor is connected with the reference voltage terminal of the power supply circuit via a power supply port of the touch control circuit, and the second electrode of the interference sensing capacitor is connected with a corresponding first port;
 wherein the power supply circuit is used to provide a first DC voltage signal or a second DC voltage signal to the interference layer of the display panel via the reference voltage terminal and the power supply port, wherein a voltage value of the first DC voltage signal is greater than that of the second DC voltage signal.

14. The display-and-touch system according to claim 13, wherein the display panel is an OLED panel, and the interference layer is one of a cathode layer and an anode layer of the OLED panel closer to the touch panel;
 wherein the reference voltage terminal is used to provide the second DC voltage signal when the interference layer is the cathode layer of the OLED panel, or the reference voltage terminal is used to provide the first DC voltage signal when the interference layer is the anode layer of the OLED panel.

15. A touch sensing method used in a display-and-touch system according to claim 6, and the method comprises:
 receiving an interference sensing signal from the at least one interference sensing capacitor through the at least one interference sensing channel;
 receiving touch sensing signals from the plurality of touch sensors through the plurality of touch sensing channels;
 determining a touch position in the display-and-touch system based on the touch sensing signals received from the plurality of touch sensors and the interference sensing signal received from the at least one interference sensing capacitor,
 wherein the at least one interference sensing capacitor is insensitive to a touch on the touch panel and interference other than interference from an interference layer of the display panel, and a first electrode of each interference sensing capacitor is connected with the interference layer of the display panel, and a second electrode of interference sensing capacitor is connected with a corresponding interference sensing channel.

16. The touch sensing method according to claim 15, wherein
- the at least one interference sensing capacitor and the touch control circuit are integrated in one chip, and the at least one interference sensing capacitor each is an independent capacitor or an existing capacitor in the at least one interference sensing channel; or
- the at least one interference sensing capacitor is located in an encapsulation interface between the touch panel together with the display panel and the touch control circuit, and the at least one interference sensing capacitor each is an independent capacitor or a capacitor of the encapsulation interface per se; or
- the at least one interference sensing capacitor is located in an area outside a touch area where the plurality of touch sensors are located in the display panel, and the at least one interference sensing capacitor each is an independent capacitor, or,
- the at least one interference sensing capacitor each is a capacitor between one interference sensor of at least one interference sensor and the interference layer, and the at least one interference sensor and the plurality of touch sensors are arranged in the touch panel.

17. A touch panel for a display-and-touch system, wherein the display-and-touch system comprises a display panel, a touch panel and a touch control circuit, the touch panel comprises:

a plurality of touch sensors and at least one interference sensor, wherein each touch sensor is used to provide a touch sensing signal to the touch control circuit, and there is a parasitic capacitor between each touch sensor and an interference layer of the display panel, and each touch sensor is connected with a corresponding touch sensing channel in the touch control circuit;

each interference sensor is used to provide an interference sensing signal to the touch control circuit, and there is a parasitic capacitor between each interference sensor and the interference layer of the display panel to serve as an interference sensing capacitor, each interference sensor is connected with a corresponding interference sensing channel in the touch control circuit, and each interference sensing capacitor is insensitive to touch on the touch panel and interference other than interference from the interference layer.

18. The touch panel according to claim 17, wherein the display panel is an OLED panel, and the interference layer is one of a cathode layer and an anode layer of the OLED panel which is closer to the touch panel.

* * * * *

UNITED STATES PATENT AND TRADEMARK OFFICE
CERTIFICATE OF CORRECTION

PATENT NO. : 11,726,616 B2
APPLICATION NO. : 17/738590
DATED : August 15, 2023
INVENTOR(S) : Hung-Kai Chen et al.

It is certified that error appears in the above-identified patent and that said Letters Patent is hereby corrected as shown below:

In the Claims

At Column 22, Line 23, "channel;" should be -- channel, --.

At Column 22, Line 45, "claim 3, wherein" should be -- claim 3, --.

At Column 23, Line 14, "channel;" should be -- channel, --.

At Column 24, Line 19, "according" should be -- according to --.

At Column 25, Line 17, "capacitor, or," should be -- capacitor; or --.

Signed and Sealed this
Seventh Day of May, 2024

Katherine Kelly Vidal
*Director of the United States Patent and Trademark Office*